US006530303B1

(12) United States Patent
Parks et al.

(10) Patent No.: US 6,530,303 B1
(45) Date of Patent: Mar. 11, 2003

(54) TABLE SAW

(75) Inventors: James R. Parks, White Hall, MD (US); Robert S. Gehret, Hampstead, MD (US); William R. Stumpf, Kingsville, MD (US); Frederick R. Bean, Finksburg, MD (US); Daniel Puzio, Baltimore, MD (US); Michael L. O'Banion, Westminster, MD (US); Lewis H. Rohr, Fayetteville, NC (US); Robert P. Welsh, Hunt Valley, MD (US); Carl F. Merhar, III, Baltimore, MD (US); Scott M. Livingston, Catonsville, MD (US); David E. Duncanson, W. Newbury, MA (US); Adan Ayala, Owings Mills, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/569,843

(22) Filed: May 12, 2000

Related U.S. Application Data

(60) Provisional application No. 60/138,495, filed on Jun. 10, 1999.

(51) Int. Cl.[7] .................................................. B27B 5/24
(52) U.S. Cl. .......................... 83/473; 83/477.1; 83/581; 83/477.2
(58) Field of Search ............................ 83/477.2, 477.1, 83/473, 581, 508.2, 698.11, 491, 609

(56) References Cited

U.S. PATENT DOCUMENTS

| 984,995 A | 2/1911 | Badge |
| 1,034,068 A | 7/1912 | Bley |
| 1,056,453 A | 3/1913 | Roberts |
| 1,092,518 A | 4/1914 | Brooks |
| 1,223,112 A | 4/1917 | Rixson |
| 1,299,367 A | 4/1919 | McMichael |
| 1,336,799 A | 4/1920 | Vaughan |
| 1,359,394 A | * 11/1920 | Leaver, Jr. .................... 83/473 |

(List continued on next page.)

FOREIGN PATENT DOCUMENTS

| DE | 843897 | 7/1952 |
| DE | 863546 | 1/1953 |
| DE | 1183216 | 3/1960 |

(List continued on next page.)

OTHER PUBLICATIONS

Delta Precision Saw, Guide Brochure, 1996 month unknown.

Primary Examiner—Kenneth E. Peterson
Assistant Examiner—Omar Flores-Sánchez
(74) Attorney, Agent, or Firm—Adan Ayala

(57) ABSTRACT

The table saw disclosed herein includes a table, a saw assembly pivotally attached to the table, the saw assembly comprising an arbor movable relative to the table, a bevel shaft operatively connected to the saw assembly for pivoting the saw assembly, and a height shaft operatively connected to the saw assembly for moving the arbor relative to the table, wherein distance between the height shaft and the table is larger than distance between the bevel shaft and the table. Also disclosed is a saw includes a table having a first miter gauge slot, a base supporting the table, a saw assembly pivotably connected to at least one of the table and the base for carrying a rotatable cutting tool so that the tool protrudes through and above the table, at least part of the saw assembly being underneath the table, the saw assembly comprising a cradle, and a sector gear connected to the cradle, and a first bevel stop disposed underneath the first miter gauge slot, wherein the first bevel stop can contact the sector gear when the saw assembly is pivoted in one direction.

25 Claims, 31 Drawing Sheets

U.S. PATENT DOCUMENTS

| | | | |
|---|---|---|---|
| 1,379,623 A | 5/1921 | Hallowell | |
| 1,486,808 A | 3/1924 | Smith | |
| 1,880,885 A | 10/1932 | Dittmar | |
| 1,894,010 A | 1/1933 | Tautz | |
| 1,985,614 A | 12/1934 | Merrigan | |
| 2,010,882 A | 8/1935 | Ocenasek | |
| 2,168,282 A * | 8/1939 | Tautz | 83/473 |
| 2,237,556 A | 4/1941 | Hedgpeth | |
| 2,256,606 A | 9/1941 | Blanc | |
| 2,265,407 A * | 12/1941 | Tautz | 83/473 |
| 2,287,738 A | 6/1942 | Johnson | |
| 2,292,797 A | 8/1942 | Roberts | |
| 2,299,262 A | 10/1942 | Uremovich | |
| 2,325,082 A | 7/1943 | Tautz | |
| 2,329,235 A | 9/1943 | Woodward | |
| 2,345,450 A | 3/1944 | Blanc | |
| 2,383,068 A | 8/1945 | MacLean | |
| 2,435,928 A | 2/1948 | Matulich | |
| 2,455,097 A * | 11/1948 | Scianna | 83/473 |
| 2,502,124 A | 3/1950 | Bray | |
| 2,530,290 A | 11/1950 | Collins | |
| 2,562,246 A | 7/1951 | VanDam | |
| 2,622,637 A | 12/1952 | Gustin | |
| 2,630,845 A | 3/1953 | Eschenburg | |
| 2,661,777 A * | 12/1953 | Hitchcock | 83/473 |
| 2,704,680 A | 3/1955 | Bedford, Jr. | |
| 2,710,633 A | 6/1955 | Oberg | |
| 2,718,815 A | 9/1955 | Manning | |
| 2,740,437 A | 4/1956 | Odlum | |
| 2,759,503 A | 8/1956 | Goldschmidt | |
| 2,771,103 A | 11/1956 | Odlum | |
| 2,787,301 A | 4/1957 | Anderson | |
| 2,806,493 A | 9/1957 | Gaskell | |
| 2,808,084 A | 10/1957 | Eschenburg | |
| 2,810,408 A * | 10/1957 | Boice et al. | 83/473 |
| 2,838,078 A | 6/1958 | Cusanza | |
| 2,850,943 A | 9/1958 | Grineff | |
| 2,852,049 A | 9/1958 | Peterson | |
| 2,853,113 A | 9/1958 | Flora | |
| 2,854,044 A | 9/1958 | Raguse | |
| 2,942,633 A | 6/1960 | King | |
| 2,966,179 A | 12/1960 | Gaskell | |
| 2,994,567 A | 8/1961 | Liebmann | |
| 3,011,529 A * | 12/1961 | Copp | 83/473 |
| 3,011,531 A | 12/1961 | Gaskell | |
| 3,083,744 A | 4/1963 | Vold | |
| 3,229,735 A | 1/1966 | Parmelee | |
| 3,315,716 A | 4/1967 | Mytinger | |
| 3,342,226 A | 9/1967 | Marcoux | |
| 3,356,111 A * | 12/1967 | Mitchell | 83/473 |
| 3,526,446 A | 9/1970 | Paige | |
| 3,604,482 A | 9/1971 | Warrick | |
| 3,841,188 A | 10/1974 | Wiater | |
| 3,872,761 A | 3/1975 | Gutowski | |
| 3,888,064 A | 6/1975 | Basile | |
| 3,994,326 A | 11/1976 | Sarten | |
| 4,002,094 A * | 1/1977 | Erickson | 83/471.3 |
| 4,105,055 A | 8/1978 | Brenta | |
| 4,133,360 A | 1/1979 | Sanfilippo | |
| 4,174,100 A | 11/1979 | Estess | |
| 4,186,784 A | 2/1980 | Stone | |
| 4,200,342 A | 4/1980 | Fall | |
| 4,206,910 A | 6/1980 | Biesemeyer | |
| 4,209,045 A | 6/1980 | Bassett | |
| 4,219,061 A | 8/1980 | Duggins | |
| 4,248,115 A | 2/1981 | Brodbeck | |
| 4,259,887 A | 4/1981 | Dean | |
| 4,265,283 A | 5/1981 | Nash | |
| 4,265,284 A | 5/1981 | Taylor | |
| 4,308,777 A | 1/1982 | Lawson | |
| 4,343,115 A | 8/1982 | Stäbler | |
| 4,367,668 A | 1/1983 | Jensen | |
| 4,370,007 A | 1/1983 | Fler | |
| 4,377,099 A | 3/1983 | Howe | |
| 4,399,728 A | 8/1983 | Davis | |
| 4,406,200 A | 9/1983 | Kerr | |
| 4,441,394 A | 4/1984 | Barsotti | |
| 4,445,412 A | 5/1984 | Peters | |
| 4,450,881 A | 5/1984 | Buttner | |
| 4,454,793 A | 6/1984 | Strong | |
| 4,455,907 A | 6/1984 | Bassett | |
| 4,476,757 A | 10/1984 | Morris | |
| 4,494,429 A | 1/1985 | Frame | |
| 4,514,909 A | 5/1985 | Gilbert | |
| 4,558,618 A | 12/1985 | Bachmann | |
| 4,558,649 A | 12/1985 | Maier | |
| 4,566,510 A | 1/1986 | Bartlett | |
| 4,593,590 A | 6/1986 | Gray | |
| 4,599,927 A | 7/1986 | Eccardt | |
| 4,600,184 A | 7/1986 | Ashworth | |
| 4,625,604 A | 12/1986 | Handler | |
| 4,641,557 A * | 2/1987 | Steiner et al. | 83/471.3 |
| 4,658,686 A | 4/1987 | Woods | |
| 4,658,687 A | 4/1987 | Haas | |
| 4,693,156 A | 9/1987 | Olvera | |
| 4,693,158 A | 9/1987 | Price | |
| 4,696,213 A | 9/1987 | Conneally | |
| 4,726,405 A | 2/1988 | Bassett | |
| 4,741,387 A | 5/1988 | Strong | |
| 4,757,616 A | 7/1988 | HIlls | |
| 4,782,871 A | 11/1988 | Aigner | |
| 4,798,113 A | 1/1989 | Viazanko | |
| 4,823,662 A | 4/1989 | Stolzer | |
| 4,846,036 A | 7/1989 | Metzger, Jr. | |
| 4,848,203 A | 7/1989 | Brooks | |
| 4,848,571 A | 7/1989 | Fullar | |
| 4,852,623 A | 8/1989 | Rodrigues | |
| 4,875,399 A | 10/1989 | Scott | |
| 4,887,653 A | 12/1989 | Thomas | |
| 4,920,846 A | 5/1990 | Duginske | |
| 4,934,423 A | 6/1990 | Withrow | |
| 4,971,488 A | 11/1990 | Mihara | |
| 5,038,486 A | 8/1991 | Ducate, Sr. | |
| 5,042,346 A | 8/1991 | McCann | |
| 5,063,983 A | 11/1991 | Barry | |
| 5,078,373 A | 1/1992 | Miller | |
| 5,097,601 A | 3/1992 | Pollak | |
| 5,101,569 A | 4/1992 | Watkins | |
| 5,105,862 A | 4/1992 | Skinner | |
| 5,113,289 A | 5/1992 | Soper | |
| 5,116,249 A | 5/1992 | Shiotani | |
| 5,135,036 A | 8/1992 | Caron | |
| 5,161,445 A | 11/1992 | Kozyrski | |
| 5,181,446 A | 1/1993 | Theising | |
| 5,186,228 A | 2/1993 | Stafford | |
| 5,191,935 A | 3/1993 | McCombie | |
| 5,201,863 A | 4/1993 | Peot | |
| 5,230,269 A | 7/1993 | Shiotani | |
| 5,239,160 A | 8/1993 | Sakura | |
| 5,275,074 A | 1/1994 | Taylor | |
| 5,282,408 A | 2/1994 | Shiotani | |
| 5,293,802 A | 3/1994 | Shiotani | |
| 5,303,035 A | 4/1994 | Luecke | |
| 5,337,641 A | 8/1994 | Duginske | |
| 5,351,730 A | 10/1994 | Lewellen | |
| 5,363,893 A | 11/1994 | Grochowicz | |
| 5,372,536 A | 12/1994 | Bialek | |
| 5,379,669 A | 1/1995 | Roedig | |
| 5,379,816 A | 1/1995 | Charlton | |
| 5,399,023 A | 3/1995 | Winkelmann | |
| 5,402,581 A | 4/1995 | Hurd | |

| | | | | | | |
|---|---|---|---|---|---|---|
| 5,443,554 | A | 8/1995 | Robert | DE | 3831378 | 9/1988 |
| 5,493,789 | A | 2/1996 | Duginske | DE | 3921680 | 7/1989 |
| 5,526,856 | A | 6/1996 | Pedri | DE | 3943134 | 12/1989 |
| 5,544,559 | A | 8/1996 | Thiele | DE | 4002047 | 1/1990 |
| 5,553,644 | A | 9/1996 | Adams | DE | 4004705 | 2/1990 |
| 5,617,909 | A | 4/1997 | Duginske | DE | 4025440 | 8/1990 |
| 5,875,698 | A * | 3/1999 | Ceroll et al. .................. 83/473 | DE | 4027316 | 8/1990 |
| 5,896,798 | A * | 4/1999 | Garuglieri .................. 83/477.1 | DE | 9016090 | 11/1990 |

FOREIGN PATENT DOCUMENTS

| | | |
|---|---|---|
| DE | 1242843 | 4/1962 |
| DE | 1453033 | 6/1963 |
| DE | 1904758 | 9/1964 |
| DE | 1918891 | 11/1964 |
| DE | 1503948 | 9/1966 |
| DE | 1628865 | 2/1968 |
| DE | 1950512 | 10/1969 |
| DE | 7239236 | 10/1972 |
| DE | 2419573 | 4/1974 |
| DE | 2443550 | 9/1974 |
| DE | 2606126 | 2/1976 |
| DE | 7714781 | 5/1977 |
| DE | 2809201 | 3/1978 |
| DE | 2910095 | 3/1979 |
| DE | 2919611 | 5/1979 |
| DE | 2931697 | 8/1979 |
| DE | 3003029 | 1/1980 |
| DE | 3009780 | 3/1980 |
| DE | 3101662 | 1/1981 |
| DE | 3109605 | 3/1981 |
| DE | 3215758 | 4/1982 |
| DE | 3222259 | 6/1982 |
| DE | 3302482 | 1/1983 |
| DE | 3307287 | 3/1983 |
| DE | 3313268 | 4/1983 |
| DE | 8309866 | 4/1983 |
| DE | 3408943 | 3/1984 |
| DE | 3422211 | 6/1984 |
| DE | 227204 | 8/1984 |
| DE | 3505645 | 2/1985 |
| DE | 3507047 | 2/1985 |
| DE | 3517455 | 5/1985 |
| DE | 3538760 | 10/1985 |
| DE | 8615156 | 6/1986 |
| DE | 3637714 | 11/1986 |
| DE | 3706921 | 3/1987 |
| DE | 8801070 | 1/1988 |
| DE | 9103189 | 3/1991 |
| DE | 4200713 | 1/1992 |
| DE | 9202908 | 3/1992 |
| DE | 9307570 | 5/1993 |
| DE | 9307635 | 5/1993 |
| DE | 9307670 | 5/1993 |
| DE | 9307674 | 5/1993 |
| DE | 9307682 | 5/1993 |
| DE | 4322672 | 7/1993 |
| DE | 4421364 | 6/1994 |
| DE | 9420679 | 12/1994 |
| DE | 29505256 | 3/1995 |
| DE | 19515829 | 4/1995 |
| DE | 19519645 | 5/1995 |
| DE | 19527098 | 7/1995 |
| DE | 29513842 | 9/1995 |
| DE | 29603431 | 2/1996 |
| DE | 29720848 | 11/1997 |
| EP | 0014869 | 1/1980 |
| EP | 0062379 | 3/1982 |
| EP | 0118077 | 2/1984 |
| EP | 0234214 | 1/1987 |
| EP | 0236814 | 2/1987 |
| EP | 0283553 | 9/1987 |
| EP | 0149233 | 8/1989 |
| EP | 0479818 | 6/1990 |
| EP | 0570904 | 5/1993 |
| EP | 0585841 | 8/1993 |
| EP | 0589282 | 9/1993 |
| GB | 786096 | 4/1955 |
| JP | 5191391 | 1/1950 |
| JP | 55174303 | 6/1954 |
| JP | 54113595 | 5/1979 |
| JP | 6094905 | 6/1985 |
| JP | 60194501 | 12/1985 |
| TW | 143243 | 10/1990 |
| WO | 92/16340 | 10/1992 |

* cited by examiner

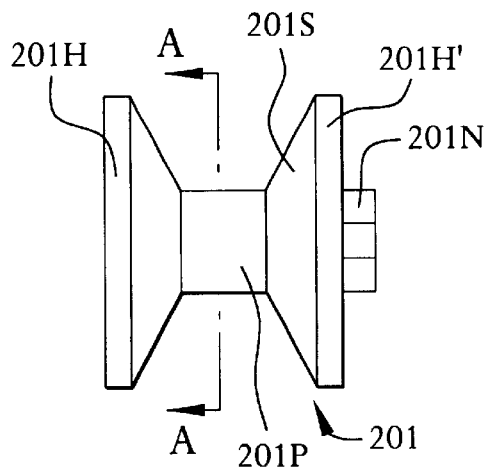
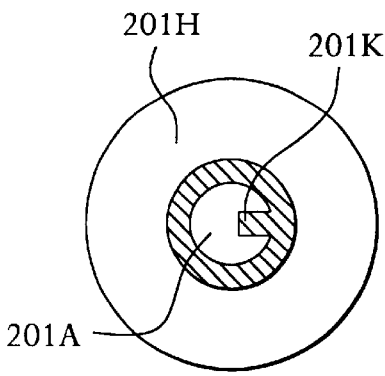
FIG. 6        FIG. 7A
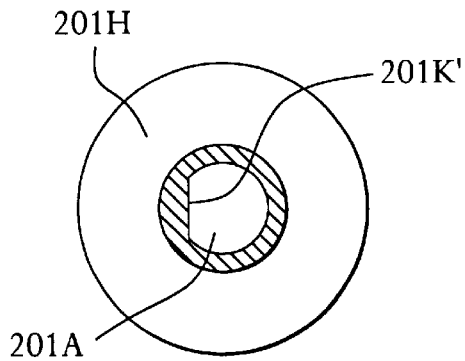
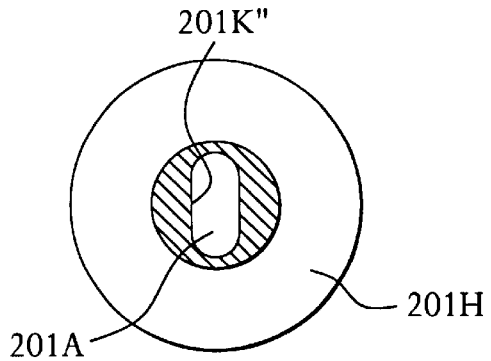
FIG. 7B       FIG. 7C
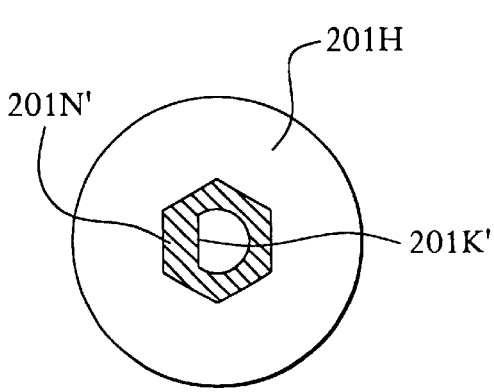
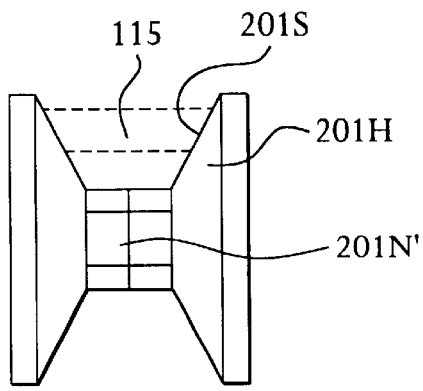
FIG. 7D       FIG. 7E

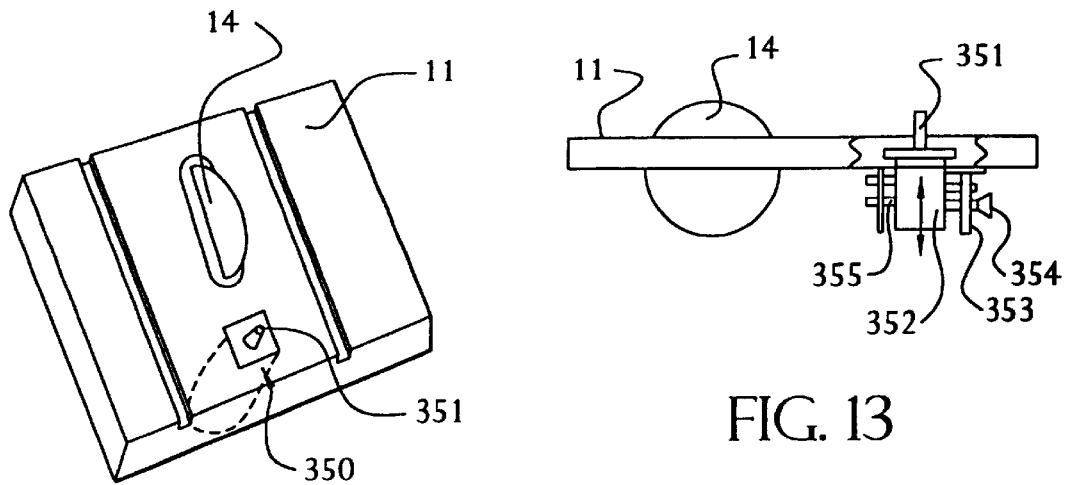
FIG. 12
FIG. 13
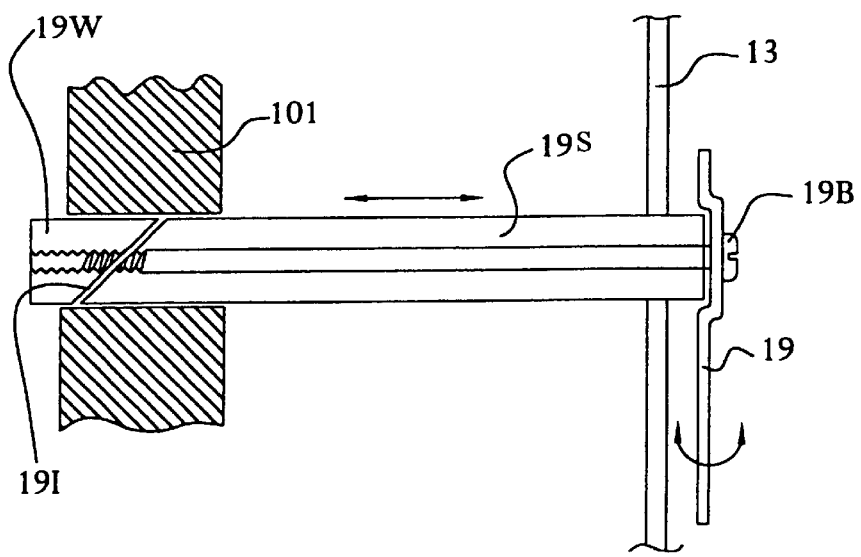
FIG. 14

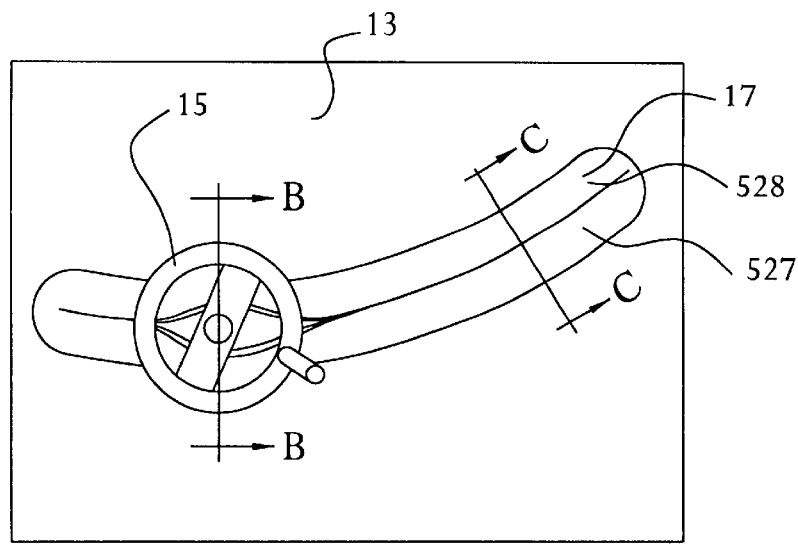
FIG. 22
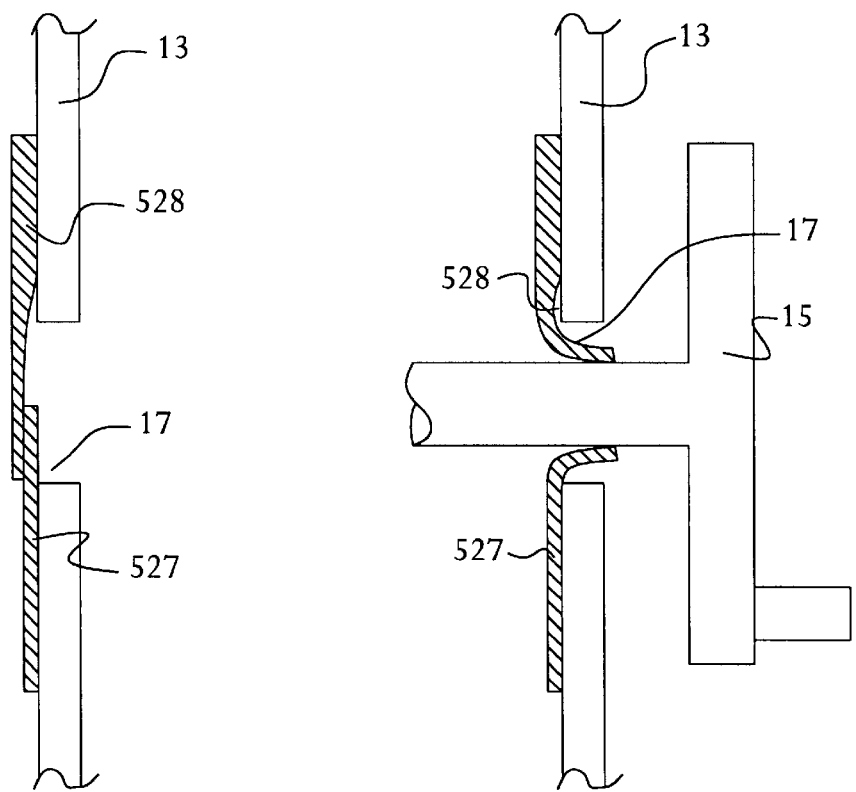
FIG. 23
FIG. 24

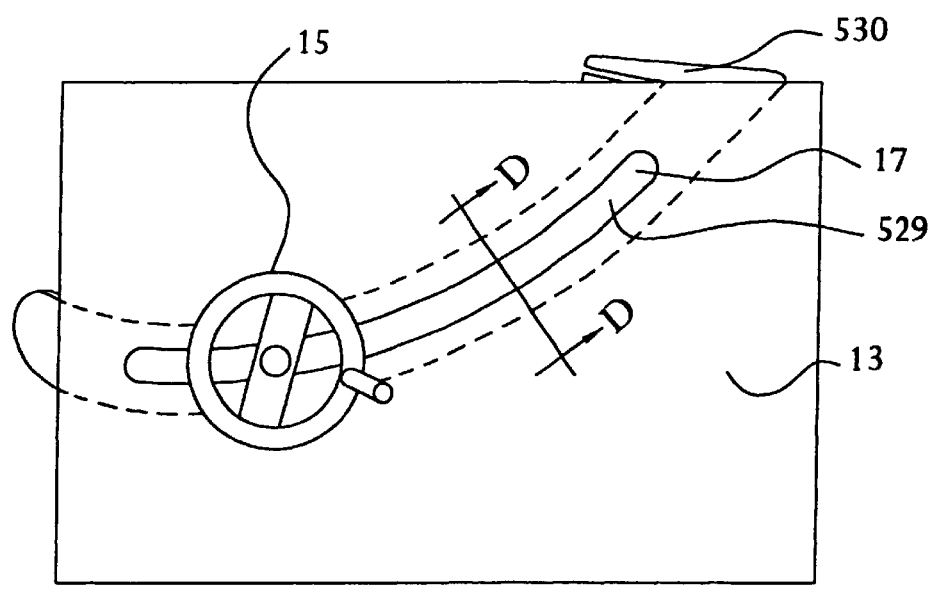
FIG. 25
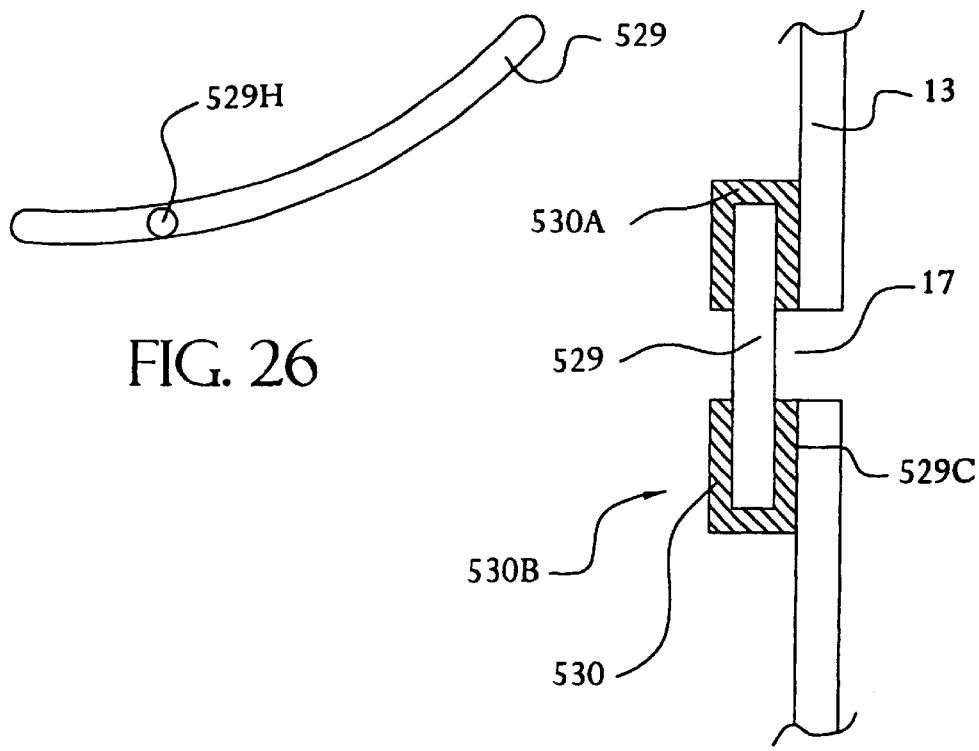
FIG. 26
FIG. 27

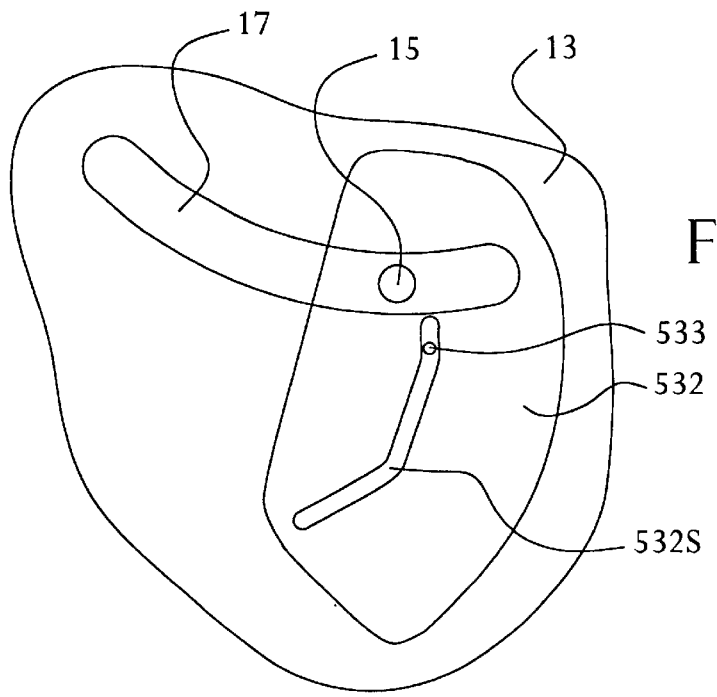
FIG. 29B
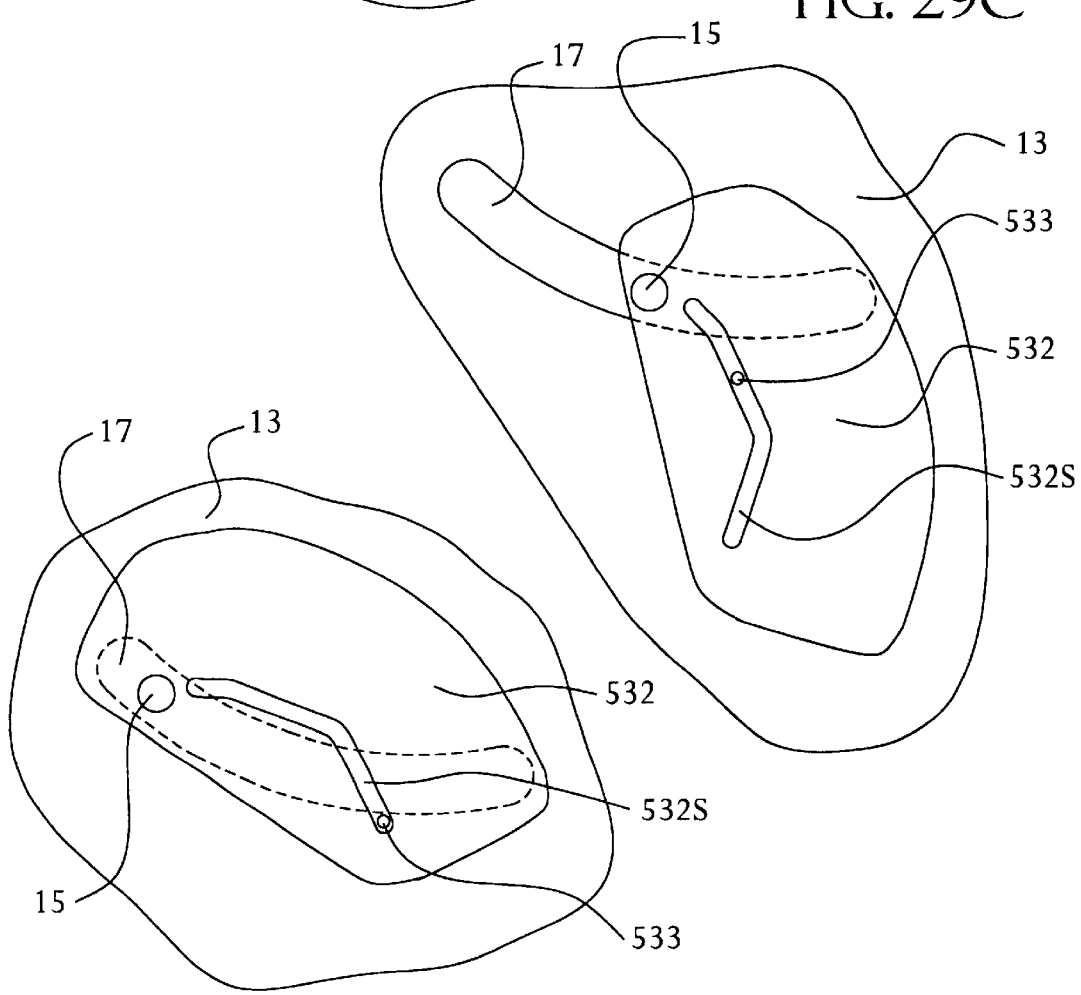
FIG. 29C
FIG. 29D

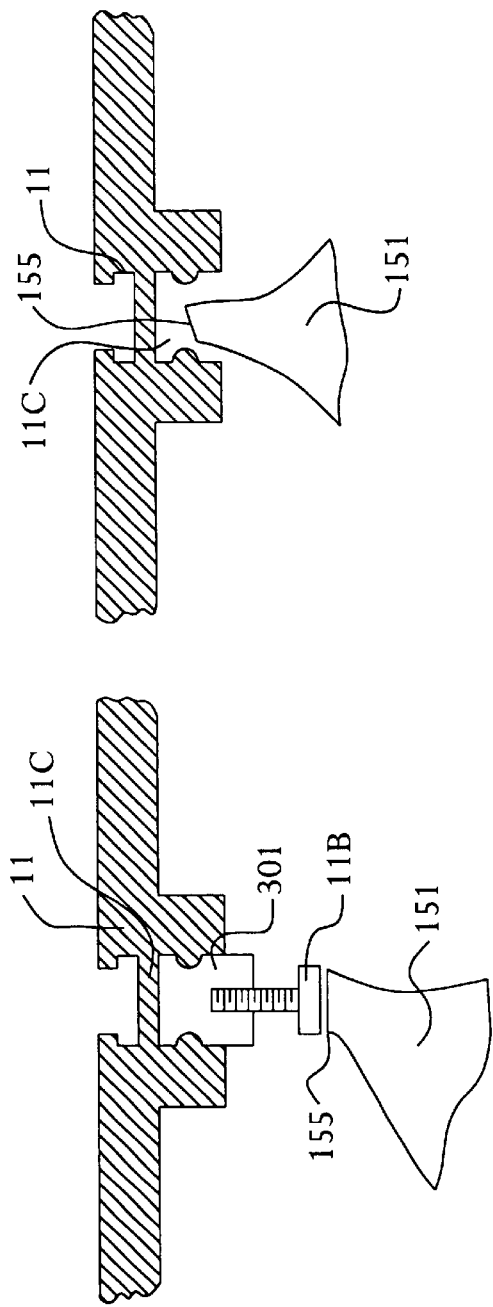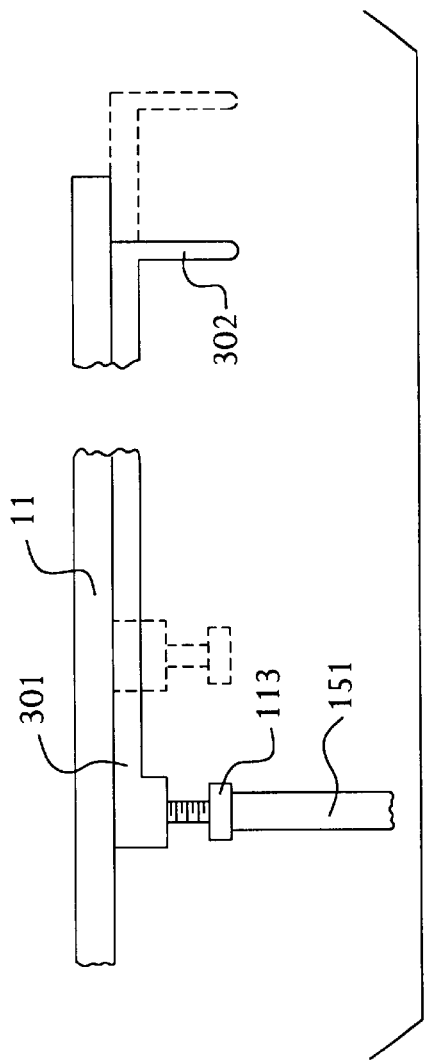
FIG. 34A    FIG. 34B
FIG. 35

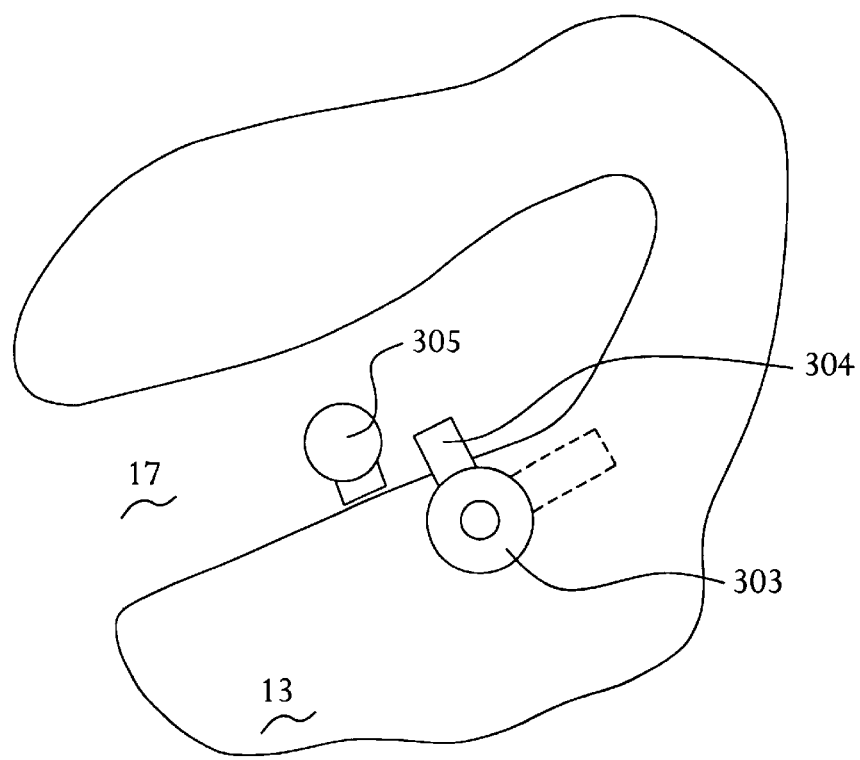
FIG. 36
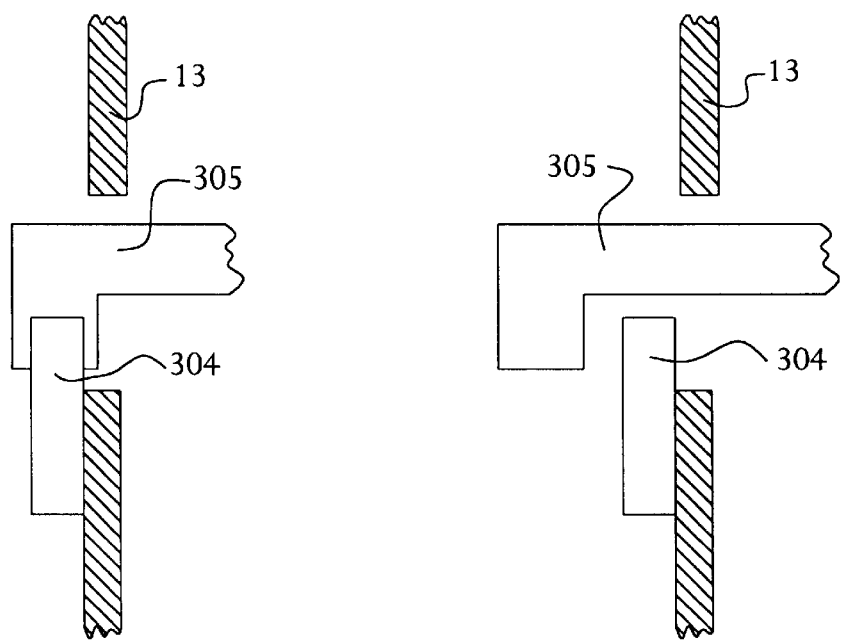
FIG. 37A                    FIG. 37B

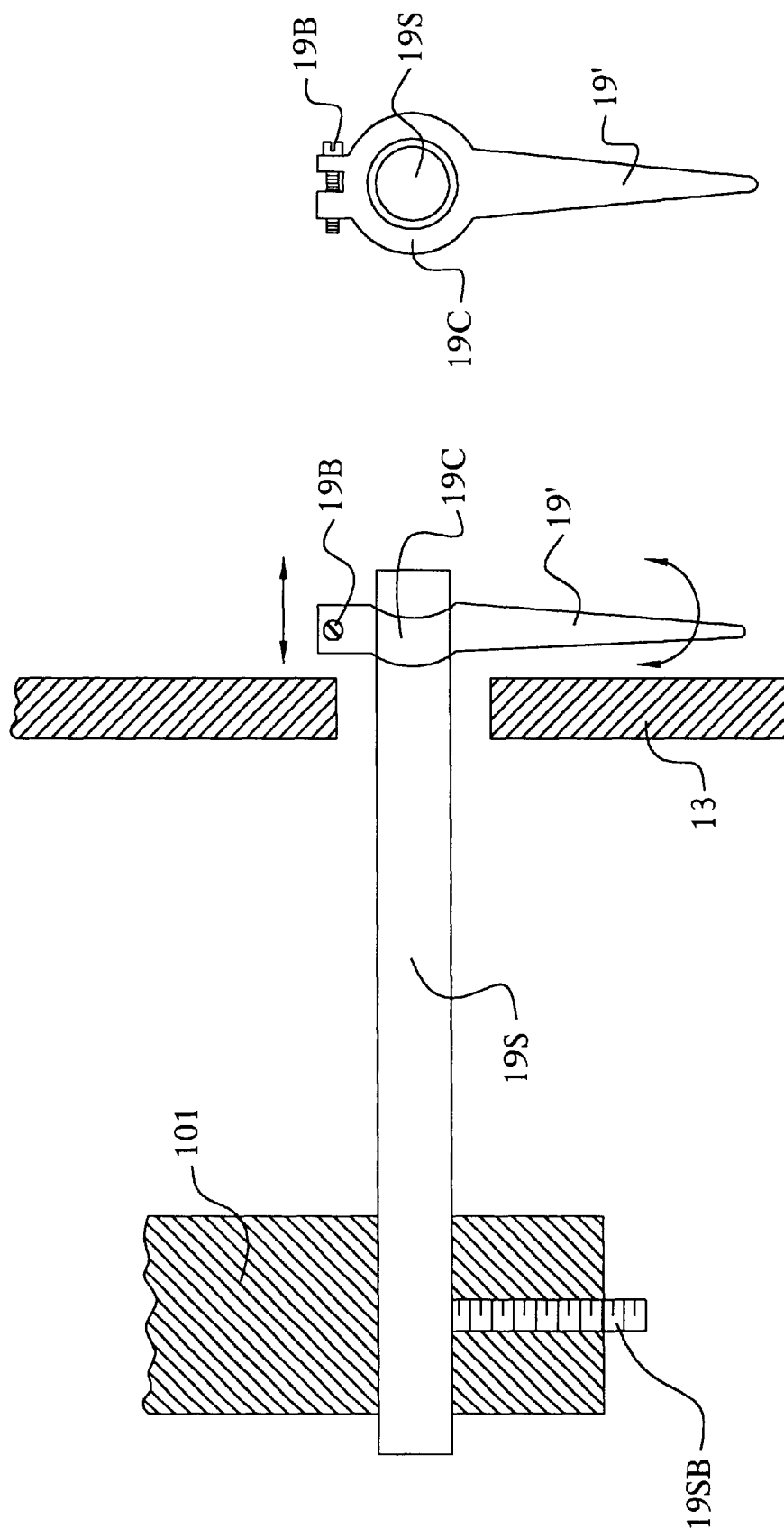

TABLE SAW

This application claims the benefit of Provisional Application No. 60/138,495, filed Jun. 10, 1999.

FIELD OF THE INVENTION

This invention relates generally to table saws.

BACKGROUND OF THE INVENTION

Generally, a table saw for cutting work pieces has a table and a saw assembly beneath the table. The saw assembly carries a blade. Typically, the height and the angle of the blade relative to the table can be changed by rotating two crank wheels, e.g., a height crank wheel and a bevel crank wheel, which interact with worm gears of the saw assembly. Usually, the height crank wheel is placed higher than the bevel crank wheel. This is problematic for several reasons. First, based on the typical construction, the height crank is too close to the underside of the table, making it uncomfortable or difficult to turn the height crank. Second, if the height crank is lowered to avoid such problem, a large number of crank wheel revolutions is required to change the height and/or bevel angle from the minimum to the maximum.

Persons skilled in the art have attempted to minimize the number of revolutions by increasing the pitch of the worm gears. Such solution however makes the blade more difficult to finely adjust, thus increasing the possibility of error. Such solution may also increase the possibility of backdrives, thus requiring additional locks to keep the saw assembly in place.

SUMMARY OF THE INVENTION

In accordance with the present invention, an improved table saw is employed. The table saw comprises a table, a saw assembly pivotally attached to the table, the saw assembly comprising an arbor movable relative to the table, a bevel shaft operatively connected to the saw assembly for pivoting the saw assembly, and a height shaft operatively connected to the saw assembly for moving the arbor relative to the table, wherein distance between the height shaft and the table is larger than distance between the bevel shaft and the table.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 6 is a front elevational view of a pulley;

FIG. 7 illustrates several side elevational views along line A—A of different embodiments of a pulley half, where FIGS. 7A, 7B, 7C and 7D illustrate first, second, third and fourth embodiments of the pulley half, respectively, and FIG. 7E illustrates a pulley having two pulley halves as shown in FIG. 7D;

FIG. 12 is a perspective view of a table saw with a scoring router;

FIG. 13 is a partial cross-sectional view of the table saw of FIG. 12

FIG. 14 is a partial cross-sectional view of a bevel pointer assembly;

FIG. 22 is a front elevational view of a second embodiment of a slot seal mechanism;

FIG. 23 is a cross-sectional view along line C—C of FIG. 22;

FIG. 24 is a cross-sectional view along line B—B of FIG. 22;

FIG. 25 is a front elevational view of a third embodiment of a slot seal mechanism;

FIG. 26 is a detailed view of a sliding plate;

FIG. 27 is a cross-sectional view along line D—D of FIG. 25;

FIGS. 29A–D are rear elevational views of the slot seal mechanism of FIG. 28, illustrating the movement of the first plate as the shaft moves from one end of the bevel slot to the other end;

FIGS. 34A and 34B are partial cross-sectional views of a first embodiment of a bevel stop bypassing mechanism;

FIG. 35 is a partial side elevational view of the mechanism of FIGS. 34A and 34B;

FIG. 36 is a partial front elevational view of another embodiment of a bevel stop bypassing mechanism;

FIGS. 37A and 37B are partial cross-sectional views of a further embodiment of a bevel stop bypassing mechanism;

FIG. 51 is a partial cross-sectional side view of an alternate pointer arrangement; and FIG. 52 is a front view of the pointer arrangement of FIG. 51.

DETAILED DESCRIPTION

Figure 4:
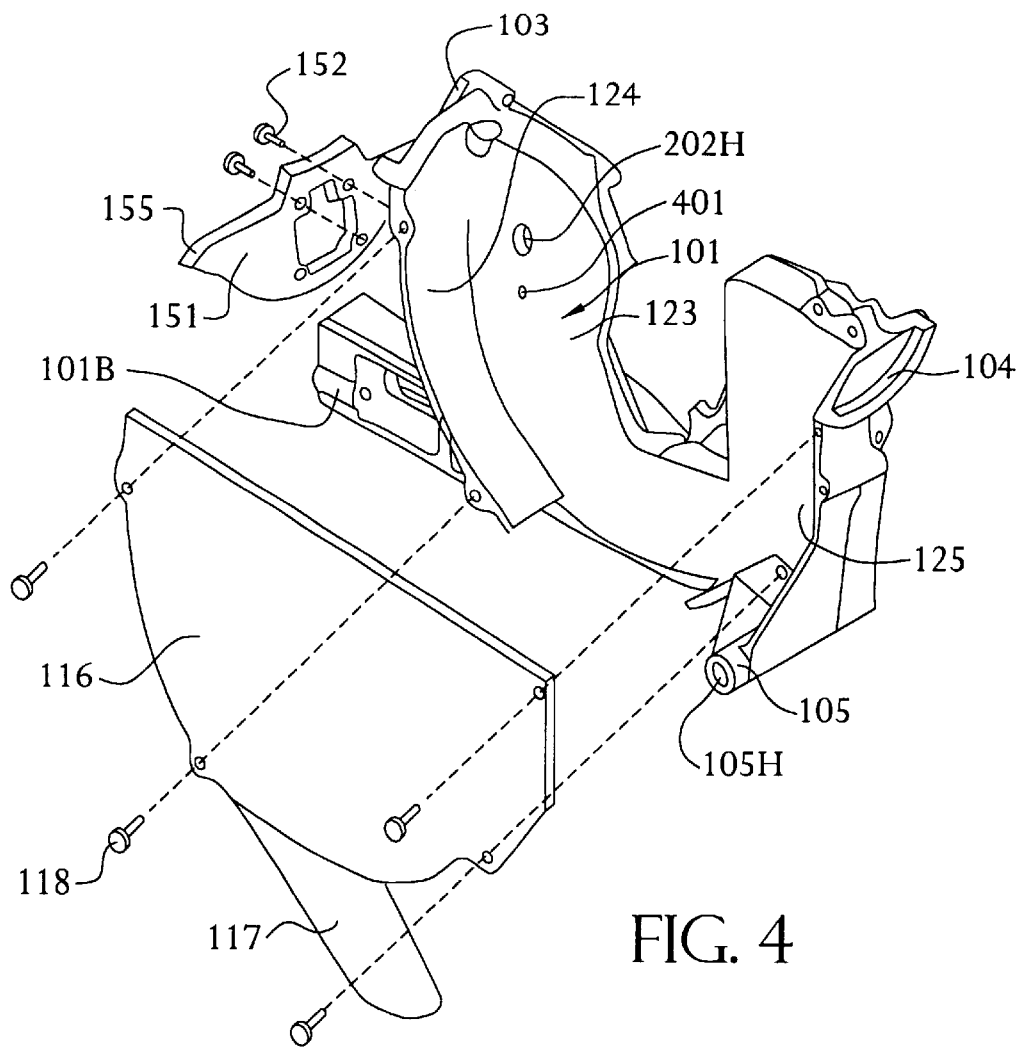
FIG. 4 is a rear perspective view of the saw assembly.

The invention is now described with reference to the accompanying figures, wherein like numerals designate like parts. Persons skilled in the art are also referred to U.S. patent application Ser. No. 09/213,466, filed on Dec. 17, 1998 and entitled "Table Saw", which is hereby incorporated in whole by reference.

Referring to FIGS. 1–5, an exemplary table saw 10 may have a table 11, a base assembly 2, including legs 12, supporting the table 11, and a front panel 13 connected to the base assembly 2, legs 12 and/or table 11.

Saw Assembly 100

A saw assembly 100 is pivotally attached underneath the table 11. Saw assembly 100 carries a rotatable cutting tool, such as blade 14. Saw assembly 100 may include a cradle 101. Cradle 101 is preferably made of cast iron to absorb vibration and/or reduce noise.

Preferably cradle 101 has a side wall 123, a front wall 124 and a rear wall 125. A removable side cover 116 may be also attached to cradle 101 via bolts 118. Preferably side cover 116 is made of plastic and may have a dust exhaust chute 117 disposed thereon, to direct dust created throughout the cutting operation. Dust chute 117 may include a detachable elbow 117A. Alternatively, a hose 117H connected to a vacuum source (not shown) may be attached thereon. Persons skilled in the art will recognize that the side cover 116 may have front and/or rear walls 124, 125.

Ribs 102 may be disposed on side wall 123 and/or cradle 101 to increase rigidity and strength while adding minimal weight.

Persons skilled in the art will recognize that the cradle/side cover combination has a generally U-shaped cross-section. Blade 14 is preferably disposed between side cover 116 and side wall 123.

Cradle 101 may have a front arcuate track 103 and a rear arcuate track 104. These tracks 103, 104 are slidably received by grooves in front trunnion bracket 121 and rear trunnion bracket 111, respectively, which are attached to the underside of table 11 via bolts 112. Such connection allows the cradle 101 to be rotated about a substantially horizontal axis A, thus allowing the operator to change the angle of blade 14 relative to table 11, i.e., the bevel angle. The horizontal axis A is preferably co-planar to table 11.

Persons skilled in the art will recognize that tracks and grooves may be alternately disposed on the trunnion brackets and the cradle 101, respectively. Persons skilled in the art will also recognize that the cradle 101 may be pivotally attached to the front panel 13, legs 12 or other parts of base assembly 2.

Cradle 101 may also have a pivot joint 105, for pivotally attaching bracket 108 to cradle 101. Pivot joint 105 may have a hole 105H extending through cradle 101. Preferably, bracket 108 has two side walls with holes, so that a pin 105P can extend through the first wall, hole 105H and the second wall. Preferably bearing sleeves 105L are disposed between hole 105H and pin 105P, to minimize friction therebetween. A retainer clip 105R can then be used to maintain pin 105P in place.

Bracket 108 is preferably welded to the housing of motor 109. Persons of ordinary skill in the art will recognize that bracket 108 may be attached to motor 109 via screws, etc. Bracket 108 may have a hole (not shown) therewith to allow dust chute 117 to extend therethrough.

Motor 109 is preferably electric and may be a universal electric motor, an induction motor or switched reluctance motor. Preferably, saw assembly 100 is designed so that motor 109 is wholly disposed within base assembly 2 and/or underneath table 11. Motor 109 may drive a shaft 113, which in turn drives a pulley 114. A belt 115 drivingly connects pulley 114 to pulley 201 in arbor assembly 200, which is explained in more detail below.

Persons skilled in the art will recognize that, due to the weight of motor 109 and/or bracket 108, motor 109 and/or bracket 108 will pivot about joint 105 and away from the cradle 101, thus increasing tension of belt 115. It is also beneficial to provide a second force, in addition to gravity, to cause such pivoting action. Accordingly, cradle 101 is provided with a protrusion 106. A compression spring 107 can then be placed on the protrusion 106 and between cradle 101 and bracket 108. Preferably, protrusion 106 has threads, or a reasonable facsimile, so that the spring 107 can be easily rotated into engagement therewith. Persons skilled in the art will recognize that it is preferable to use compression springs, rather than torsion springs, as they are less expensive and simpler to manufacture.

Figure 48:
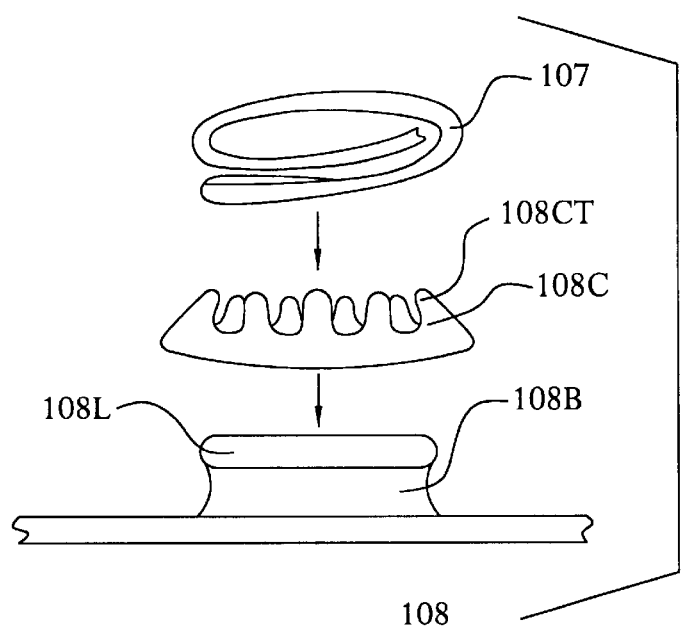
FIG. 48 is a partial side exploded view of the motor bracket of FIG. 3.

Referring to FIG. 48, bracket 108 may be provided with a boss 108B for receiving spring 107. Boss 108B may have a lip 108L. A push nut 108C is preferably pushed onto boss 108B. Push nut 108C may have tines 108CT, which preferably scrape paint off boss 108B as push nut 108C is pushed onto boss 108B. Preferably tines 108CT are resilient so as to maintain contact with boss 108B.

Trunnion Alignment

In typical table saws, if the trunnions 111, 121 are misaligned, the blade 14 may also be misaligned during bevel cuts. Persons skilled in the art have suggested placing shims between the table 11 and the rear trunnion 111, or shims between the table 11 and the front trunnion 121, depending on the orientation of the blade misalignment. However, this is problematic as such solution could require removal of the front panel 13.

It is thus proposed to dispose at least one shim 111S between a trunnion and the table 11 during manufacture of saw 10. The saw assembly 100 may then be aligned during manufacture after providing the shims 111S. The shims 111S may have a thickness of less than about ⅛th of an inch. Preferably, the shims 111S are disposed between rear trunnion 111 and table 11.

With such arrangement, the operator need only replace the shim 111S with a slimmer or thicker shim. In other words, the operator would not need to adjust the unshimmed trunnion. Accordingly, if the shimmed trunnion is rear trunnion 111, the operator would not need to adjust front trunnion 121, which is typically not easily accessible. Instead, the operator would only adjust the rear trunnion 111 which is easily accessible.

Arbor Assembly 200

Figure 3:
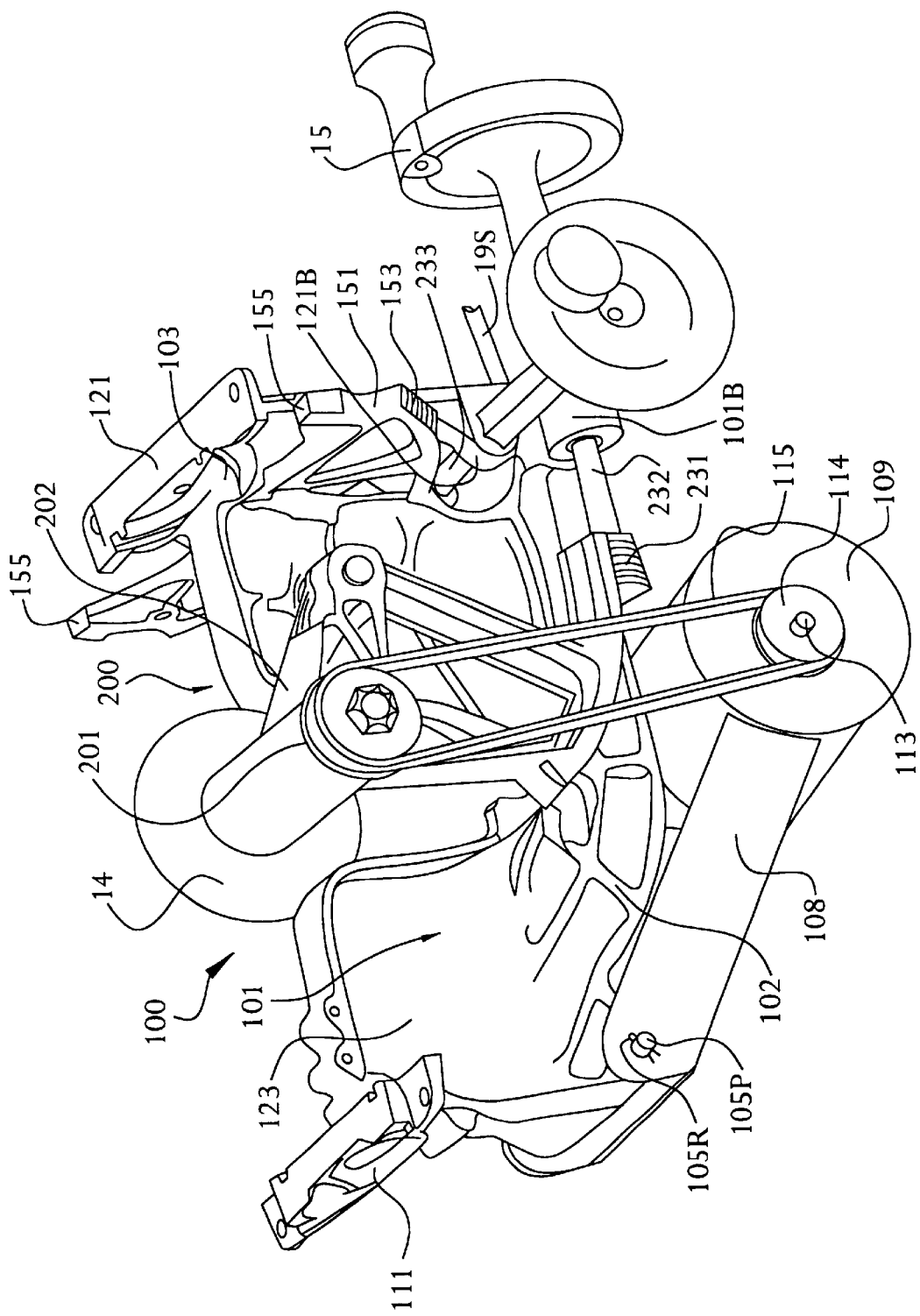
FIG. 3 is a front perspective view of the saw assembly.
Figure 5:
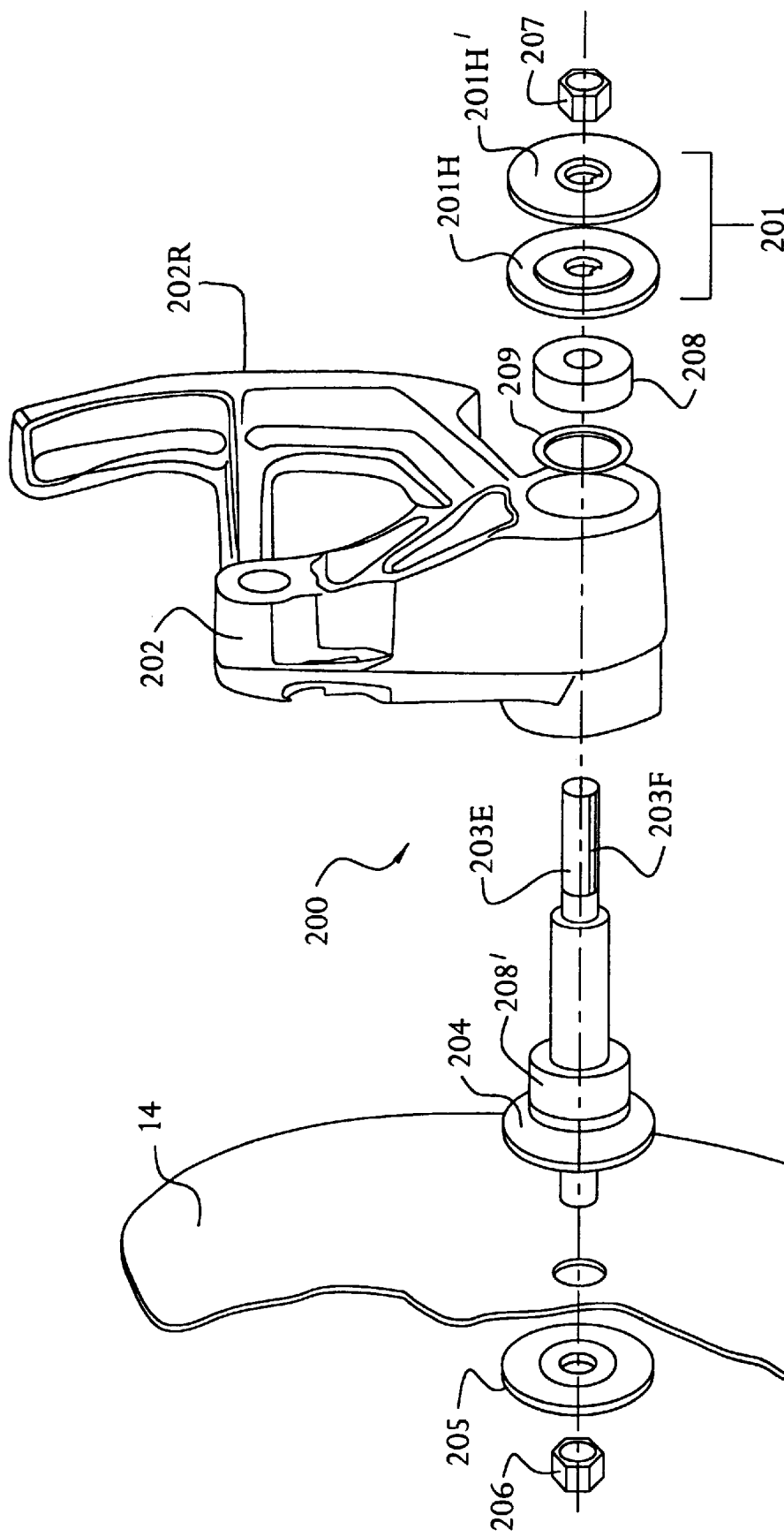
FIG. 5 is an exploded view of the arbor assembly.

Referring to FIGS. 3–5, saw assembly 100 preferably comprises an arbor assembly 200. Arbor assembly 200 may include an arbor bracket 202, which is preferably pivotally attached to cradle 101 via hole 202H. Arbor bracket 202 rotatably supports arbor 203 and thus blade 14. Accordingly, the height of blade 14 relative to the table 11 can be adjusted by rotating arbor assembly 200.

As shown in FIG. 5, the end 203E of arbor 203 farthest from blade 14 is inserted into and through arbor bracket 202, washer 209 and bearing 208. Preferably washer 209 and bearing 208 are disposed within bracket 202. End 203E then extends through pulley 201, which are kept in place by a nut 207 threadingly engaged to end 203E.

At the opposite end, bearing 208' and a first blade clamp 204 may be disposed on arbor 203. Preferably, bearing 208' is contained within bracket 202. Blade 14 is then disposed on arbor 203 and between first blade clamp 204 and second blade clamp 205. A nut 206 threading engages arbor 203 and retains this assembly in place. Preferably, arbor 203 extends into the area between side wall 124 and side cover 116.

Referring to FIGS. 5–7C, pulley 201 may be made of two pulley halves 201H, 201H', which in turn could be made of powdered metal. Preferably, each half has an inclined surface 201S, that could direct the belt 115 to the middle portion 201P of pulley 201, or provide a surface for driving belt 115 as shown in FIG. 7E. Each half has an shaft hole 201A for receiving arbor 203.

Preferably, each half has a surface that engages positively with surface 203F of end 203E, thus ensuring positively engagement between pulley 201 and arbor 203. Surface 203F could be a groove for receiving key 201K in the pulley of FIG. 7A, a flat surface for contacting flat key 201K' in the pulley of FIG. 7B, or two flat surfaces for contacting the double flat key 201K" in the pulley of FIG. 7C. Persons skilled in the art will recognize that other alternatives for ensuring positive engagement exist, such as providing a groove in the pulley halves that engage or receive a key disposed on arbor 203, providing curved surfaces in the pulley which contact other surfaces of arbor 203, etc.

Referring to FIG. 6, it is preferable that one of the pulley halves have an integral nut portion 201N which can be engaged with a standard wrench. Having such nut portion 201N allows a user to hold the arbor 203 in place, while removing nut 206, thereby facilitating pulley removal and/or replacement. Alternatively, the middle portion (201P in FIG. 6) may shaped in a hexagonal shape, basically providing an integral nut portion 201P' which can be engaged with a standard wrench, as shown in FIGS. 7D–7E.

Figure 8:
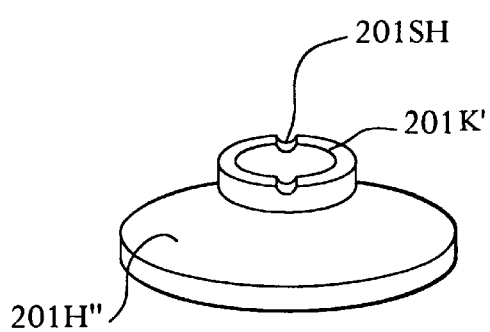
FIG. 8 is a perspective view of a fifth embodiment of a pulley half.
Figure 9:
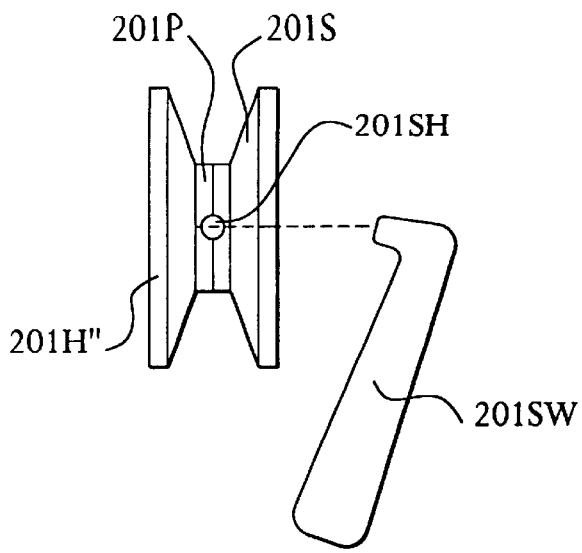
FIG. 9 illustrates a pulley having two pulley halves as shown in FIG. 8 in operation.

As shown in FIGS. 8–9, an alternate pulley may have a pulley half 201H", which in turn may have a semi-circular channel 201SH. When both pulley halves 201H" are placed together, a circular channel is formed, which can receive a spanner wrench 201SW, allowing the user to hold the arbor 203 in place, as discussed above. Persons skilled in the art should recognize that the same result can be achieved by providing the entire channel in one pulley half.

As mentioned above, the height of blade 14 relative to table 11 may be changed by rotating the arbor assembly 200. Referring to FIGS. 1–5, this can be accomplished by providing arbor bracket 202 with a rack 202R. This rack 202 meshes with a worm drive 231 disposed on height shaft 232, which is rotated via height crank wheel 15. Height shaft 232 is supported by two protrusions 101B of cradle 101, in a manner discussed more fully below. Accordingly, height shaft 232 and worm drive 231 rotate when height crank wheel 15 is rotated. Worm drive 231 meshes with rack 202R, causing arbor bracket 202 (and arbor assembly 200) to rotate, changing the height of blade 14.

Riving Knife Mechanism 400

Figure 43A:
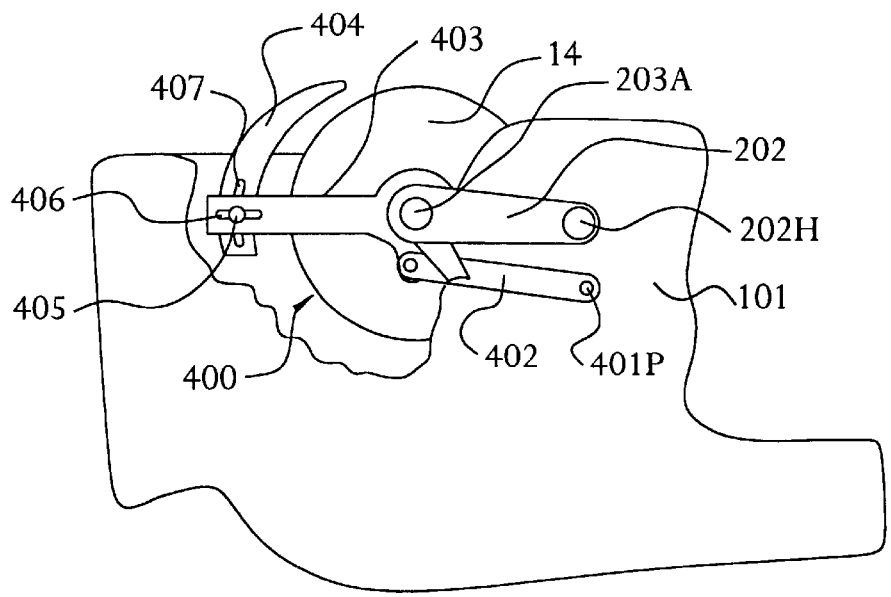
FIGS. 43A and 43B illustrate the saw assembly with a riving knife mechanism in different positions.
Figure 43B:
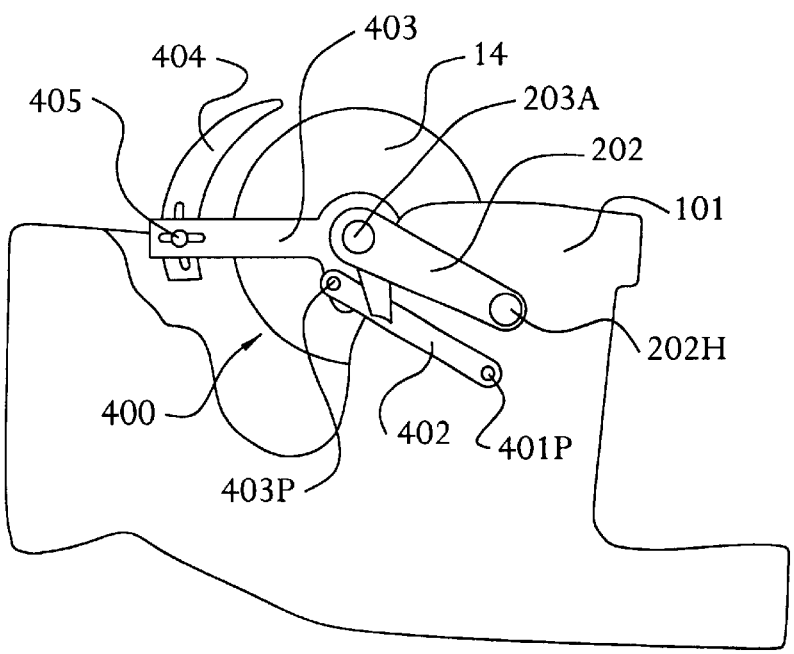
Figure 44:
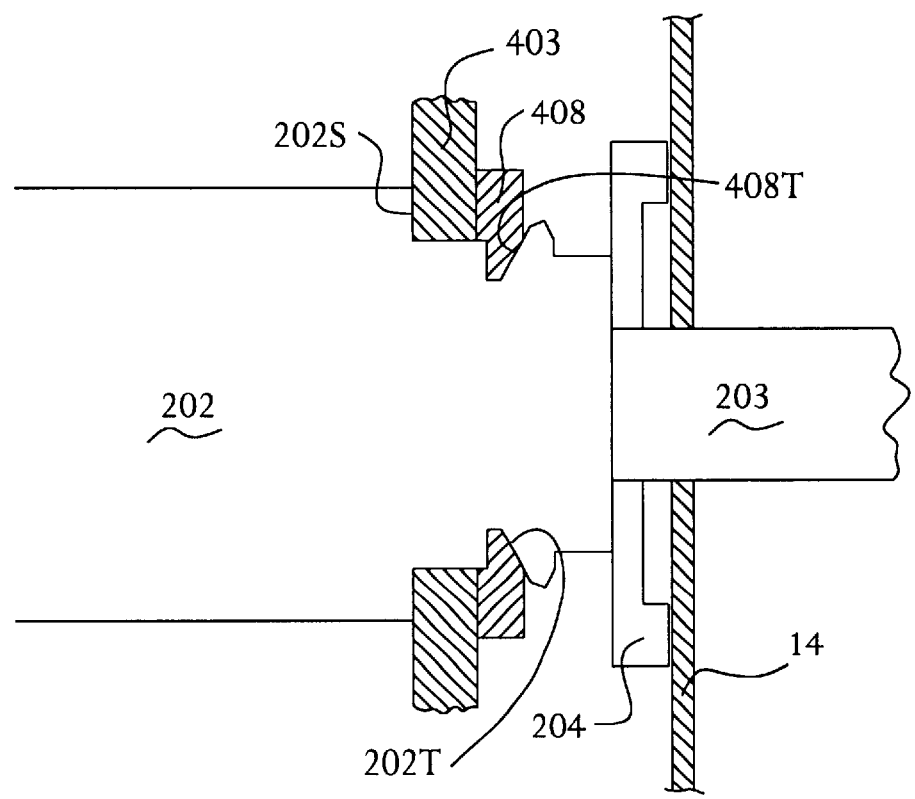
FIG. 44 is a partial cross-sectional view of the connection between the arbor bracket and the riving knife mechanism of FIG. 43.
Figure 45:
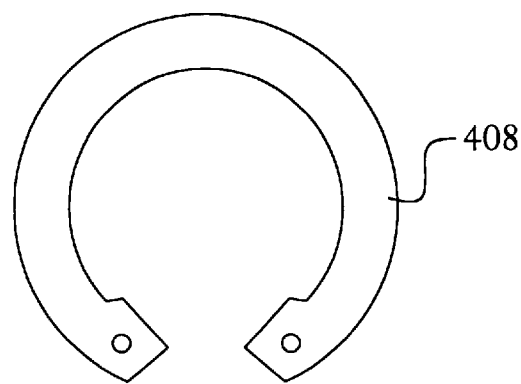
FIG. 45 is a front elevational view of a retaining clip used in the riving knife mechanism of FIG. 43.

Referring to FIGS. 43–45, the saw assembly 100 may be provided with a riving knife mechanism 400 for supporting a riving knife 404 behind blade 14. Riving knife mechanism 400 may include support arm 403, which is rotationally supported by arbor bracket 202 as described below. Riving knife 404 may be integrally formed with or attached to support arm 403. Preferably, support arm 403 and riving knife 404 are provided with slots 406, 407, respectively, and held together with a bolt 405. Accordingly, with such arrangement, riving knife 404 may be adjusted vertically and/or horizontally relative to blade 14.

Preferably, a link arm 402 is pivotally attached to cradle 101 by inserting pin 401P into hole 401 (see FIG. 4). Link arm 402 may also be pivotally attached to support arm 403 via pin 403P. Preferably, the positioning of pins 401P, 403P is such that link arm 402 is substantially parallel to a line extending between hole 202H and arbor axis 203A. In this manner, as arbor bracket 202 is pivoted, link arm 402 pivots the same amount, forcing support arm 403 (and thus riving knife 404) to remain in the same position relative to blade 14, regardless of movement of arbor bracket 202. Preferably support arm 403 is kept substantially parallel to the table plane. Persons skilled in the art will recognize that link arm 402 may be made parallel to other lines, thus forming a parallelogram arrangement, to achieve the same purpose, i.e., maintaining the position of support arm 403 and/or riving knife 404 relative to blade 14 regardless of arbor bracket movement.

Support arm 403 may be disposed against shoulder 202S of arbor bracket 202. Support arm 403 may be then held in place by a retaining clip 408. Preferably clip 408 is made of a resilient material. Clip 408 may have an inclined, or tapered, surface 408T, which contacts a tapered surface 202T of arbor bracket 202. Alternatively, clip 408 may have a non-tapered surface, contacting tapered surface 202T, or vice versa. Accordingly, as clip 408 contracts, it moves along surface 202T and against support arm 403, thus pushing support arm 403 against shoulder 202S.

Beveling Mechanisms

The angle of blade 14 relative to table 11 may be changed in a manner similar to the blade height. Referring now to FIGS. 1–4 and 11, cradle 101 may be provided with a bevel sector gear 151 thereon. Preferably, bevel sector gear 151 is attached to cradle 101 via screws 152. Bevel sector gear 151 has a rack 153 which meshes with a worm drive (not shown) disposed on bevel shaft 233, which is rotated via bevel crank wheel 16. Bevel shaft 233 is supported by two protrusions 121B of front trunnion bracket 121, in a manner similar to the mounting of height shaft 232. Accordingly, bevel shaft 233 and its worm drive rotate when bevel crank wheel 16 is rotated. The worm drive meshes with rack 233, causing cradle 101 and blade 14 to rotate, thus changing the bevel angle of blade 14 relative to table 11.

Preferably, bevel sector gear 151 has elongated slots 154 through which screws 152 extend. Accordingly, bevel sector gear 151 may be vertically adjustable relative to cradle 101 to fine-tune the meshing between the worm drive and the rack 153. Such arrangement, for example, thus allows removal of gear backlash at the 0° bevel angle without requiring additional parts, such as the eccentric bushings required in the prior art. Persons skilled in the art recognize that other equivalent means for allowing vertical movement of the bevel sector gear 151 exist. Nonetheless, they are equivalents of the described embodiment.

Preferably, the ratio of the worm drive and the rack 153 is selected so that one crank wheel rotation causes the cradle 101 to bevel a whole (non-fractional) number of degrees, i.e., about 1.0°, 2.0°, 3.0°, etc. Alternatively, the ratio may be selected so that one crank wheel rotation causes the cradle 101 to bevel about 1.50°, rather than 1.55°, or 2.50°, rather than 2.55°, etc.

Bevel sector gear 151 may also have bevel stop surfaces 155, which contact the underside of table 11 or bevel stop bolts 11B threadingly engaged to table 11. Accordingly, as cradle 101 is beveled, bevel sector gear 151 is also beveled. When one of the limits of the bevel angle range, e.g., from about 0° to 45°, is reached, bevel stop surface 155 will contact bevel stop bolt 11B, preventing any further bevel movement. Persons skilled in the art will also recognize that bevel stop bolt 11B (and thus the end limit of the bevel range) may be adjusted by rotating its head 11BH, or by inserting a wrench 11W into an indentation (not shown) disposed at the end of bolt 11B. Persons skilled in the without a head 11BH, allowing the user to insert bevel stop bolt 11B from the top of table 11.

Preferably, bevel stop bolts 11B are disposed underneath miter gauge slots 11M, so as to minimize the amount of holes on or machining to the table 11, thus providing a more level table 11. Such arrangement is possible by disposing the bevel stop surfaces 155 closer to the bottom surface 151B of bevel sector gear 151 (and/or to the rack 153) than to the top surface 151T.

The table saw may be provided with a bevel stop bypassing mechanism. Referring to FIGS. 34–35, table 11 may be provided with a channel 11C slidably receiving the bevel stop holder 301, which supports bevel stop bolt 11B. The bevel stop holder 301 may be moved between two positions: (1) a first position shown in solid lines on FIG. 35, where bevel stop surfaces 155 of bevel sector gear 151 contact bolt 11B; and (2) a second position where bevel stop surfaces 155 cannot contact bolt 11B, i.e., bypassing bolt 11B and allowing the operator to bevel cradle 101 past the bevel position defined by bolt 11B without readjusting the bolt 11B. In the second position, bevel stop holder 301 is preferably moved to the position shown in dotted lines on FIG. 35. A handle 302 may be connected to bevel stop holder 301 to move the holder between the first and second position.

Persons skilled in the art will note that in the shown embodiment, bevel stop holder 301 moves along a direction substantially parallel to the table plane. However, persons skilled in the art will recognize that bevel stop holder 301 may be configured so that it rotates between the first and second positions about an axis which may be substantially perpendicular or substantially parallel to the table plane, etc. Persons skilled in the art should also recognize that bevel sector gear 151 may be configured so that bevel stop surfaces 155 themselves can be moved between a first position contacting the stop bolts 11B and a second position bypassing the stop bolts 11B.

Figure 49:
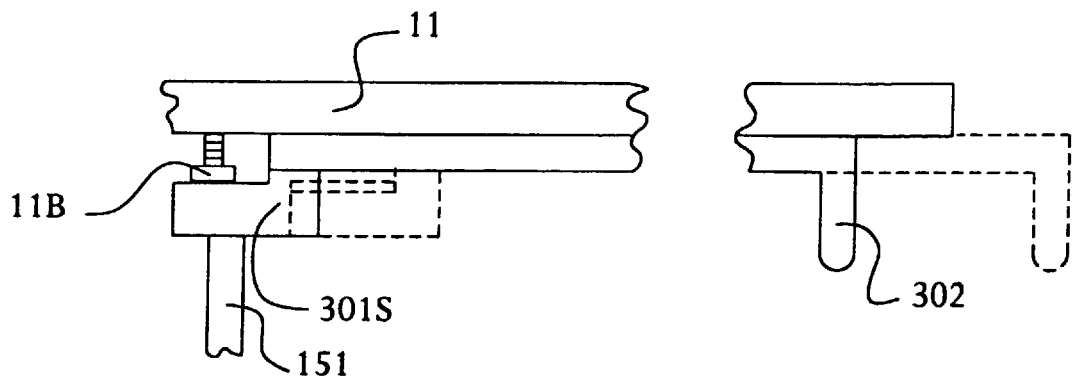
FIG. 49 illustrates an alternate embodiment of a bevel stop bypassing mechanism.

A further embodiment of the bevel stop bypassing mechanism is shown in FIG. 49. The main differences between this and the previous embodiment are that (1) stop bolt 11B may be engaged to table 11, rather than to holder 301, and (2) a movable spacer 301S is disposed between bolt 11B and bevel sector gear 151. Accordingly, bevel sector gear 151 would contact spacer 301S, rather than bolt 11B, until spacer 301S is removed, allowing sector gear 151 to move beyond.

Another embodiment of the bevel stop bypassing mechanism is shown in FIG. 36. In this embodiment, a shaft 305 is connected to cradle 101, so that, as cradle 101 bevels, shaft 305 moves along slot 17. Front panel 13 may be provided with a bevel stop 303 having a protrusion 304. Bevel stop 303 may be moved between a first position shown in solid lines, where protrusion 304 contacts shaft 305, and a second position shown in dotted lines, where shaft 305 can bypass protrusion 304.

Figures 39A, 39B:
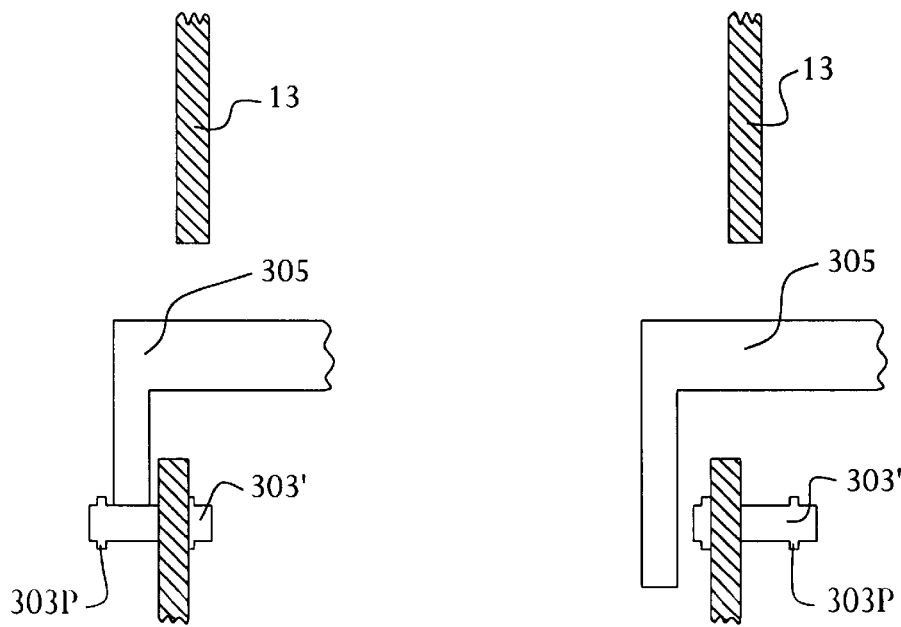
FIGS. 39A and 39B are partial cross-sectional views of a further embodiment of a bevel stop bypassing mechanism.

Persons skilled in the art will note that bevel stop 303 may be rotated about an axis substantially perpendicular to front panel 13 and/or substantially parallel to the table plane. Persons skilled in the art, however, should recognize that bevel stop 303 may alternatively be rotated about an axis substantial parallel to front panel 13 and/or substantially perpendicular to the table plane, or moved linearly in a direction substantially parallel or substantially perpendicular to front panel 13. One such arrangement is shown in FIGS. 39A–39B, where bevel stop 303' may be moved linearly between the first and second positions. Persons skilled in the art may note that bevel stop 303' may be provided with protrusions 303P to limit the movement of bevel stop 303'.

Figure 38:
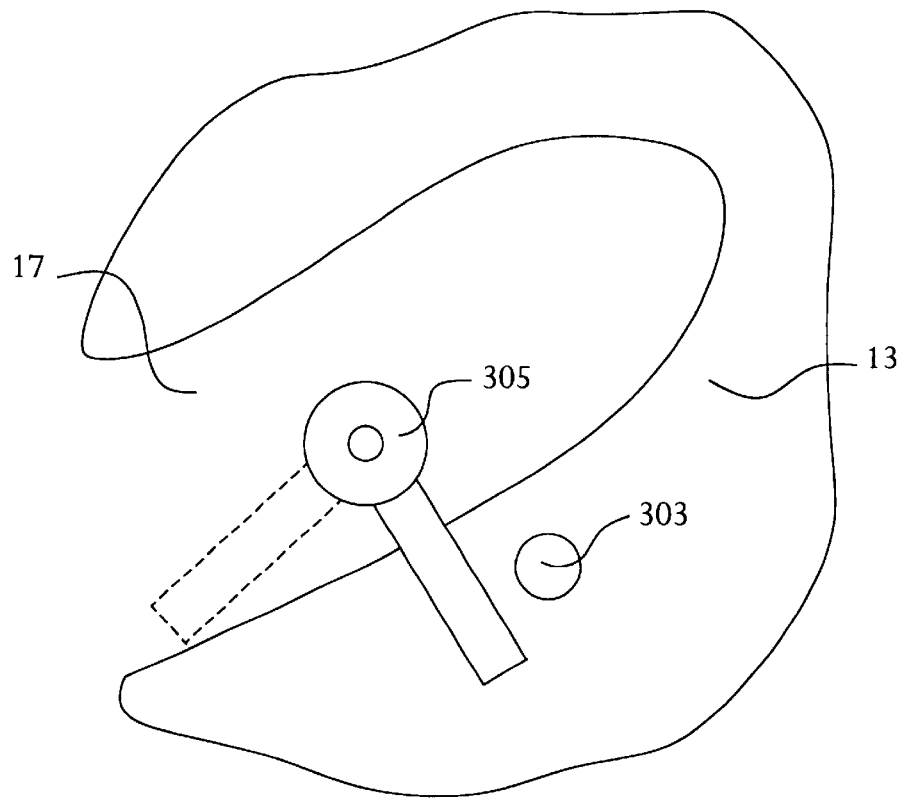
FIG. 38 is a partial front elevational view of another embodiment of a bevel stop bypassing mechanism.

Another embodiment of the bevel stop bypassing mechanism is shown in FIGS. 37A–37B. As before, a bevel stop 303 may be disposed on front panel 13. Bevel stop 303 may have a protrusion 304 to contact and stop movement of shaft 305 (and thus of cradle 101). Unlike the embodiment of FIG. 36, the shaft 305 moves linearly to bypass protrusion 304. Alternatively, shaft 305 may be rotated between the first and second positions as shown in FIG. 38.

Persons skilled in the art will recognize that more than one or two bevel stops may be disposed and/or bypassed. In other words, it is within the scope of this invention to provide three, four or more bevel stops that can be bypassed in the same manner described above.

Figure 40:
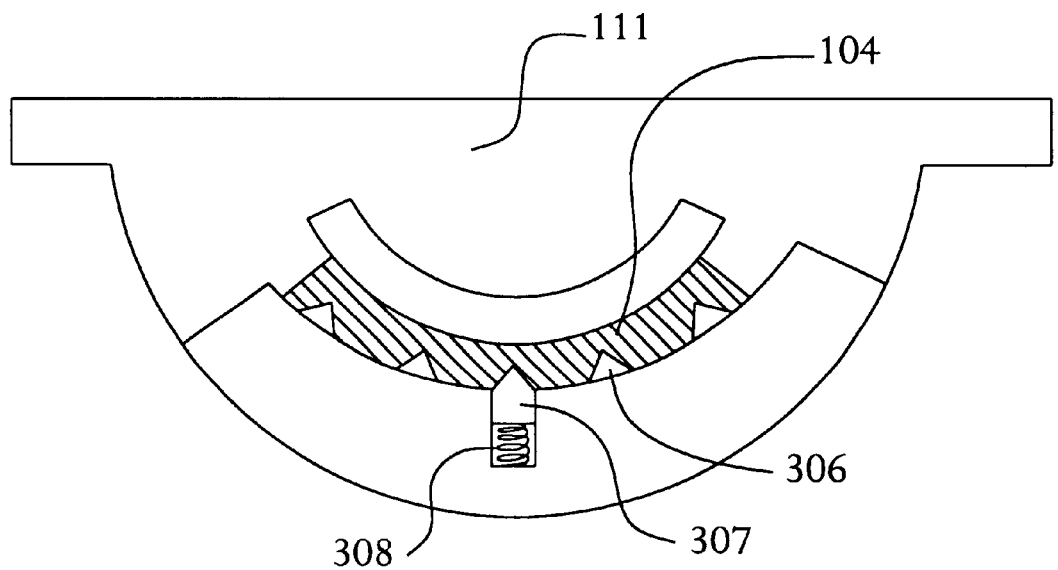
FIG. 40 is a partial cross-sectional view of a first embodiment of a bevel detent mechanism.
Figure 41:
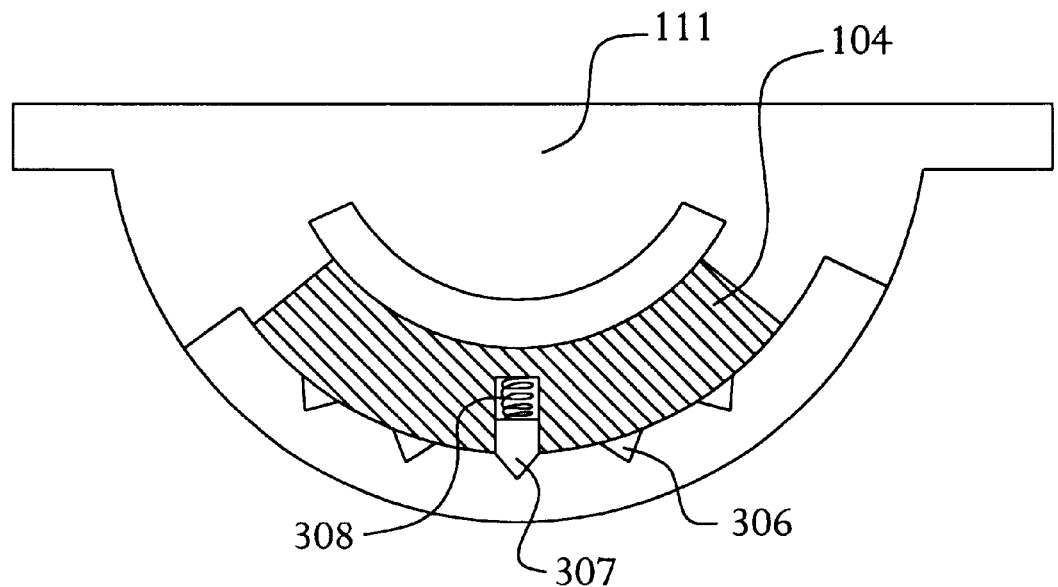
FIG. 41 is a partial cross-sectional view of another embodiment of a bevel detent mechanism.

The table saw may also be provided with a bevel detent mechanism. As shown in FIG. 40, at least one of the trunnion brackets, e.g., trunnion 111, may have a detent ball or pin 307 biased against track 104 by a spring 308. Track 104 may have detent notches 306 for receiving the detent pin 307. Preferably notches 306 are provided for the most common bevel positions, i.e., 0°, 33°. 45°, etc. Notches 306 may shaped as a conical aperture, a hole, etc., for receiving the pin 307, which may be tapered or semi-spherical, shaped like a cylinder, etc. Persons skilled in the art will recognize that the detent pin 307 may alternatively be provided on track 104 to engage notches 306 disposed on trunnion 111, as shown in FIG. 41.

Figure 42:
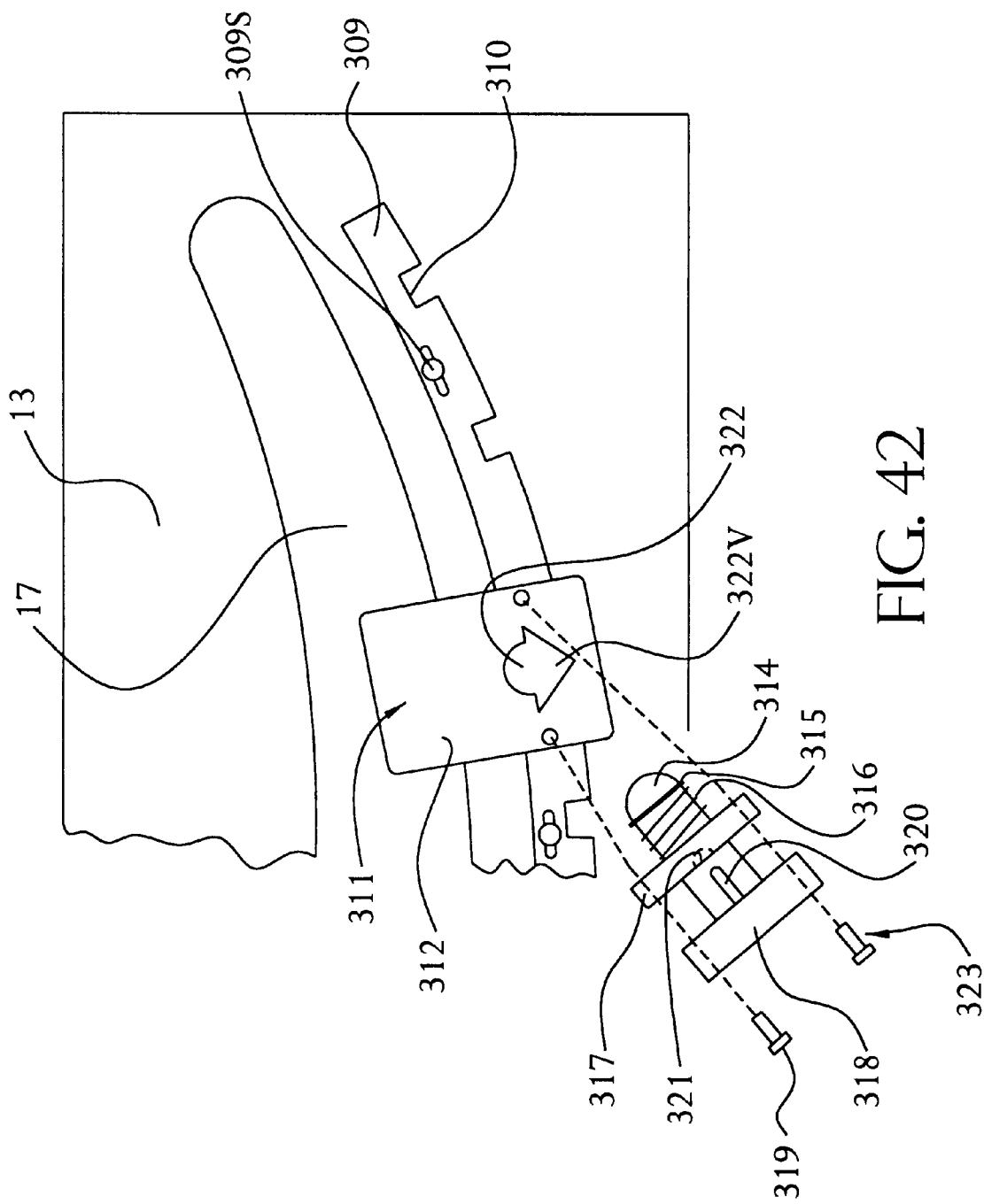
FIG. 42 is a partial front elevational view of a further embodiment of a bevel detent mechanism.

FIG. 42 illustrates another embodiment of the novel detent mechanism. This mechanism may be comprised by the detent plate 309 disposed on the front panel 13 and the latch assembly 311 supported by the saw assembly 100 and/or cradle 101 (not shown). Once again, persons skilled in the art are referred to U.S. patent application Ser. No. 09/213,466 which is incorporated by reference in its entirety, and in particular to the detent mechanism shown in FIGS. 21–23.

Preferably, the detent plate 309, preferably made of stainless steel, is slidingly attached to front panel 13. The detent plate 309 may be held on the panel 13 by a set of screws 309S. The detent plate 309 also has holes or notches 310 disposed at the outer edge of the detent plate. These notches 310 are disposed at select locations of the detent plate 309, preferably at commonly desired bevel angles. Persons skilled in the art will recognize that holes or notches 310 may be provided on front panel 13 instead.

As mentioned above, the latch assembly 311 is supported by the saw assembly 100 and/or cradle 101, and may include a latch mechanism 323 and a support 312 for supporting the latch mechanism 323. A hole 322 in support 312 may slidingly receive a pin 314. The pin 314 is connected to a knob 318, so that a user can slide the pin 314 in and out of hole 322. The hole 322 may be round. Preferably, the hole 322 has V-shaped lower portion 322v. In addition, a spring 316 may be connected between the pin 314 and a holding plate 317, normally biasing the pin 314 towards the detent plate 309. The holding plate 317 may be fixedly attached to the support 312 via screws 319. A limit plate 315 prevents the pin 314 from being pulled beyond the holding plate 317.

A detent 320 may be provided on the pin 314. The holding plate 317 has a notch (not shown) that allows the detent 320 to bypass the holding plate 317, thus allowing the pin 314 to contact the detent plate 309. The holding plate 317 also has at least one detent notch 321 disposed about 90° from the notch. Accordingly, if a user pulls out and rotates the pin 314 about 90°, the detent 320 engages the detent notch 321, holding the pin 314 is held in a retracted position (away from the detent plate 309).

With such arrangement, the pin 314 may engage a notch 310 of detent plate 309. It is thus beneficial to place, or "program", the notches 310 on the detent plate 309 to correspond with commonly desired bevel angles.

Accordingly, if the user wants to quickly and accurately find the 33° bevel angle position, the user need only to pull out the pin 314, rotate the bevel crank 16 so that cradle 101 moves towards the 33° angle position, and to let go of the pin 314. Because the pin 314 is normally biased towards the extended position, the user can continue moving the cradle 101 towards the 33° angle position until the pin 314 engages the corresponding notch 310.

The mechanism described above minimizes the "play" in the pin, providing a more accurate distance setting. This is achieved by limiting the number of contact lines between the detent plate 309 and pin 314 and between hole 322 and pin 314. The total number of contact lines is less than infinity and is preferably between 3 and 10. Persons skilled in the art are referred to FIG. 24 and the explanation connected to such figure in U.S. patent application Ser. No. 09/213,466, which is incorporated by reference.

Shaft Arrangement

Unlike in typical prior art saws, the height shaft 232 may be underneath the bevel shaft 233. In other words, the height crank wheel 15 may be lower than bevel crank wheel 16. Such arrangement is preferable for several reasons. First, as the cradle is beveled towards 45°, the height crank wheel 15 moves closer to the underside of table 11. If the height crank wheel 15 is positioned as in typical prior art saws, it may be difficult to see from the operator's standing viewpoint. It is also easier for the operator to hit his hand against the underside of the table 11. The present arrangement, however, lowers the height crank wheel 15 to avoid these problems.

Second, if the bevel shaft is above the height shaft, a larger bevel sector gear, and larger rack, may be necessary. Such arrangement would necessitate a large number of bevel crank wheel rotations to bevel from one bevel angle to the other, or a very large worm drive. The present arrangement, however, decreases the size of the bevel sector gear and/or worm drive by raising the bevel shaft, thus lowering the number of turns required for beveling.

Figure 19:
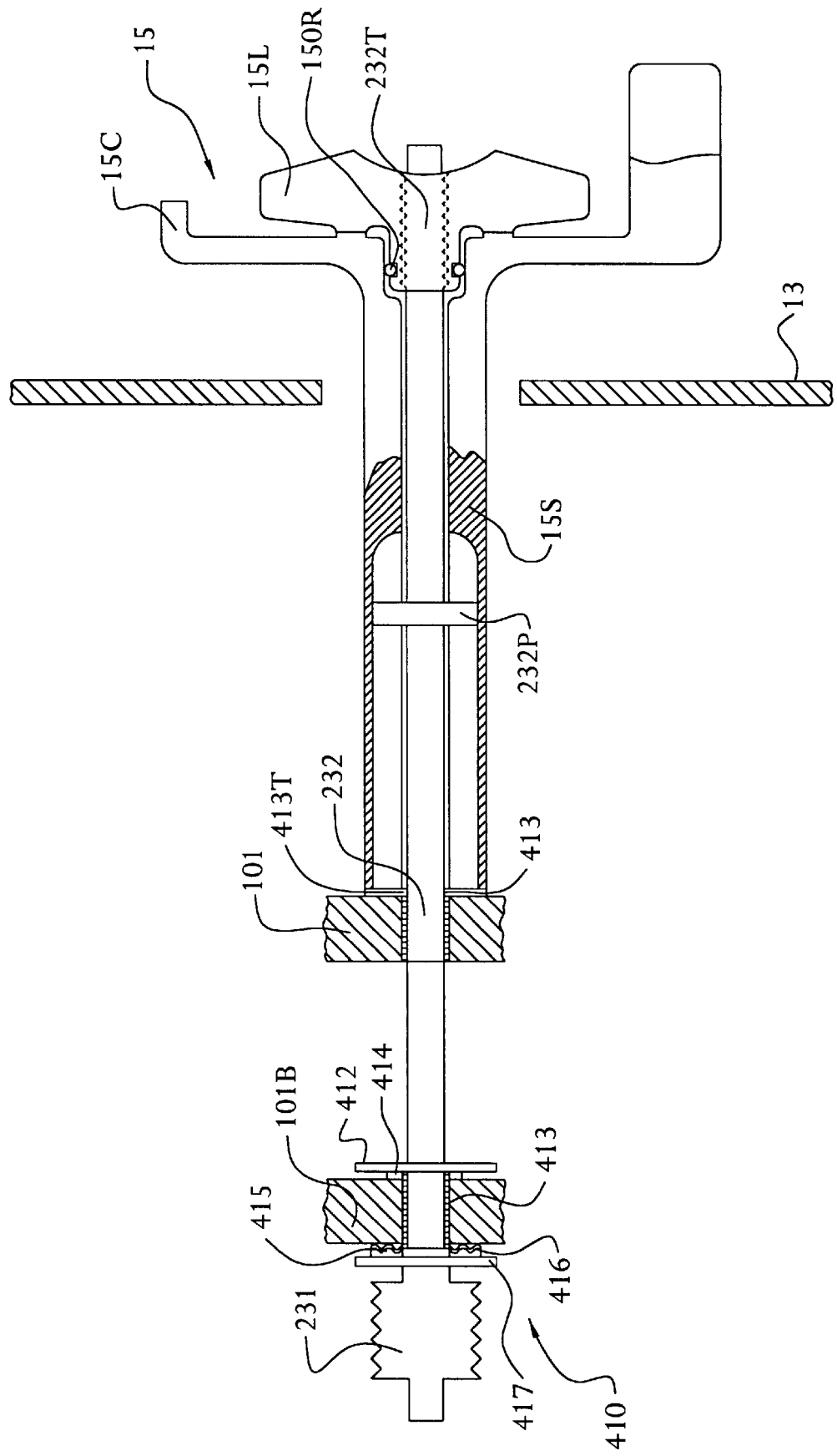
FIG. 19 is a partial cross-sectional view of a second embodiment of a crank wheel/shaft assembly.

Referring to FIG. 19, height shaft 232 is supported by cradle 101. Preferably, a bearing sleeve 413 is disposed between shaft 232 and cradle 101. Bearing sleeve 413 may be a ball bearing, roller bearing, needle bearing, cylinder bearing, or be made of plastic, such as nylon. For ease of assembly, it is preferable that bearing sleeve 413 have a top portion 413T, so that bearing sleeve 413 can be pushed into the channel disposed within protrusion 101B and kept therein.

Shaft 232 is retained by shaft retaining mechanism 410, which includes different pins and washers, as discussed below. The shaft 232 is then inserted through a first protrusion 101B and bearing sleeve 413. The shaft 232 is inserted through a washer 414, which is preferably made of plastic or metal. A pin 412 is then inserted through shaft 232, sandwiching washer 414 between protrusion 101B and/or sleeve 413 and pin 412. Shaft 232 is then inserted through the second protrusion 101B and bearing sleeve 413. A wavy, or spring, washer 415 and a washer 416 are then disposed on shaft 232. A pin 417 is then inserted through shaft 232, sandwiching washers 415, 416 between protrusion 101B and/or sleeve 413 and pin 417. Worm drive 231 is then disposed on shaft 232. Persons skilled in the art will recognize that wavy washer 415 may be replaced by a resilient washer, or one made with an elastomeric material. Having such washers allow for limited movement of shaft 232 along its axis.

Figure 50:
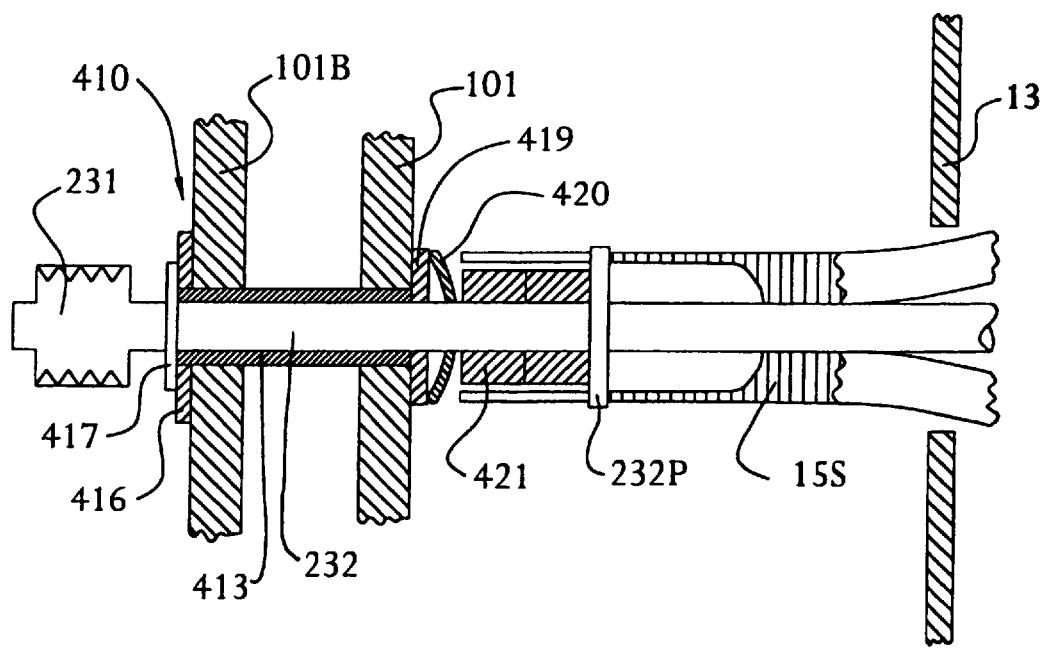
FIG. 50 illustrates an alternate shaft retaining arrangement.

An alternate embodiment of shaft retaining mechanism 410 is shown in FIG. 50, where like numerals refer to like parts. Shaft 232 is preferably inserted through spring washer 420 and washer 419. Shaft 232 is then inserted through protrusions 101B and sleeve 413. Preferably, bearing sleeve 413 extends between both protrusions 101B. Shaft 232 is then inserted through washer 416. A pin 417 is then inserted through shaft 232, sandwiching washer 416 between protrusion 101B and/or sleeve 413 and pin 417. Worm drive 231 is then disposed on shaft 232. Persons skilled in the art will recognize that washer 420 may be replaced by a resilient washer, or one made with an elastomeric material.

Persons skilled in the art will recognize that this retaining arrangement may also be used with bevel shaft 233.

Crank Locks

Figure 18:
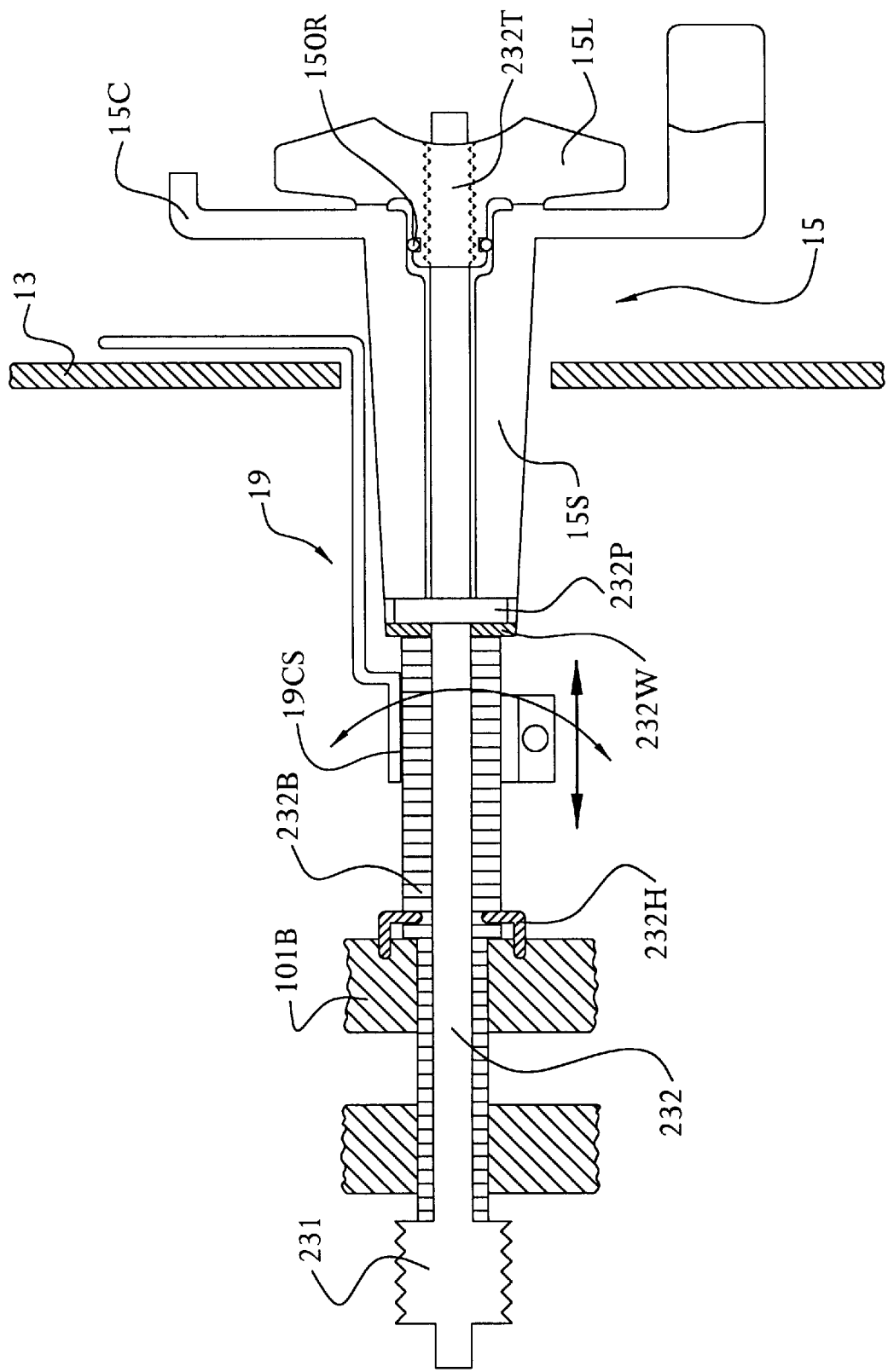
FIG. 18 is a partial cross-sectional view of a first embodiment of a crank wheel/shaft assembly.

FIG. 18 shows a first embodiment of the crank lock. Shaft 232 preferably has a worm gear 231 disposed near one end, and threads 232T disposed near the other end. Shaft 232 may have a pin 232P disposed therethrough.

Shaft 232 may also have a bearing sleeve 232B disposed between worm gear 231 and pin 232P to minimize friction between shaft 232 and protrusions 101B, in a manner similar to bearing sleeve 413, as discussed above. (Persons skilled in the art will recognize that bearing sleeve 232B could be used in the embodiment shown in FIG. 19, and that bearing sleeve 413 could be used in the embodiment shown in FIG. 18.) Bearing sleeve 413 may be fixedly attached protrusion 101B via holds 232H, which preferably prevents rotation of sleeve 413 relative to protrusion 101B. Preferably, shaft 232 is retained by a shaft retaining mechanism, such as the one shown in FIG. 19. Preferably, a thrust washer 232W is disposed between bearing sleeve 232B and pin 232P.

A crank 15C is disposed over the shaft 232. Crank 15C may have an extension 15S which engages pin 232P, so that shaft 232 rotates upon rotation of crank 15C.

A locking knob 15L may further be provided to threadingly engage threads 232T. Accordingly, upon rotation of knob 15L, knob 15L will move along the longitudinal axis towards protrusions 101B, pushing extension 15S against thrust washer 232W and/or bearing sleeve 232B, thus preventing rotation of shaft 232. Preferably, the area of extension 15S contacting thrust washer 232W and/or bearing sleeve 232B is maximized to increase locking force. An O-ring 15OR may be disposed between knob 15L and crank 15C (or extension 15S) to prevent unintended loosening of knob 15L, and thus unintended unlocking of shaft 232.

FIG. 19 shows a different embodiment of the crank lock, where like numerals refer to like parts. Since operation of both embodiments is similar, the teachings of the first embodiment are incorporated herein. The main difference is that the length of extension 15S has been increased so that extension 15S can contact protrusion 101B and/or bearing sleeve 413. Persons skilled in the art will recognize that a thrust washer may still be disposed between extension 15S and protrusion 101B and/or sleeve 413.

FIG. 50 shows a different embodiment of the crank lock, where like numerals refer to like parts. Since operation of all embodiments is similar, the teachings of the first two embodiments are incorporated herein. The main difference is that a sleeve 421 is disposed between pin 232P and washers 419,420 and/or protrusion 101 or sleeve 413. Sleeve 421 helps minimize crank wobble.

Bevel Pointer

Referring to FIGS. 1–5, the front panel 13 preferably has a bevel slot 17 that allows a height crank wheel 15 to move along, as saw assembly 100, and thus height shaft 232, are beveled. In addition, front panel 13 may have a scale 18 to indicate the bevel angle.

Preferably, a bevel pointer 19 indicates along scale 18 the bevel angle. Referring to FIG. 14, bevel pointer 19 is disposed on rod 19S, which is supported by cradle 11. Preferably, a bolt 19B extends through rod 19S and threadingly engages wedge 19W. Wedge 19W and rod 19S may have co-acting inclined surfaces 19I, so that upon rotation of bolt 19B, the diameter of the wedge/rod combination expands, locking the wedge/rod combination with cradle 101. In this manner, the rod 19S may be moved axially and locked in a preferred position, allowing the operator to effectively move pointer 19 closer to the panel 13 for more accurate scale pointing and for minimizing the parallax error when viewing the scale 18. Further, pointer 19 may be held onto rod 19S by a bolt, preferably bolt 19B, allowing the operator to pivot pointer 19 thereabout for more accurate scale pointing.

FIGS. 51–52 show a different embodiment of the bevel pointer, where like numerals refer to like parts. Since operation of both embodiments is similar, the teachings of the first embodiment are incorporated herein. The main differences between the two embodiment is that rod 19S is fixedly attached to cradle 101 and that pointer 19 can move along and/or rotate about the longitudinal axis of rod 19S. Rod 19S may be fixedly attached to cradle 101 via a set bolt 19SB, a friction fit, etc. Preferably pointer 19 has a clamping portion 19C, which can be tightened around rod 19S via screw 19B.

Alternatively, referring to FIG. 18, pointer 19 may be disposed on height shaft 232, or bearing 232B. Preferably, the pointer 19 includes a clamping sleeve 19CS that allows the operator to move the pointer 19 along the axis of shaft 232 and closer to panel 13 and/or about the axis of shaft 232.

Switches

Figure 1:
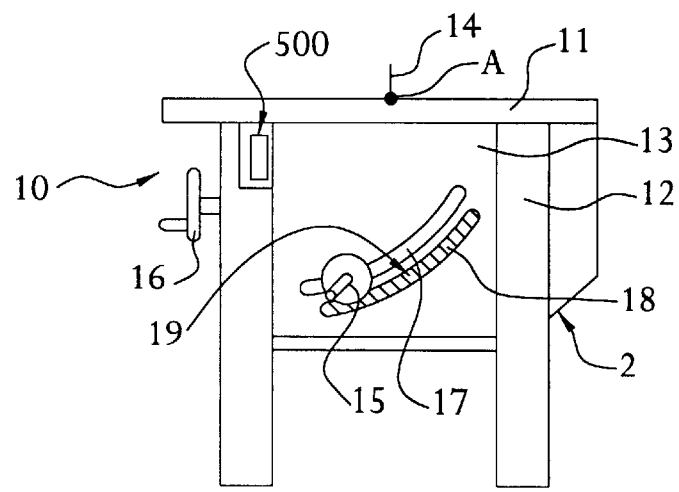
FIG. 1 is a front elevational view of an exemplary table saw according to the present invention.
Figure 2:
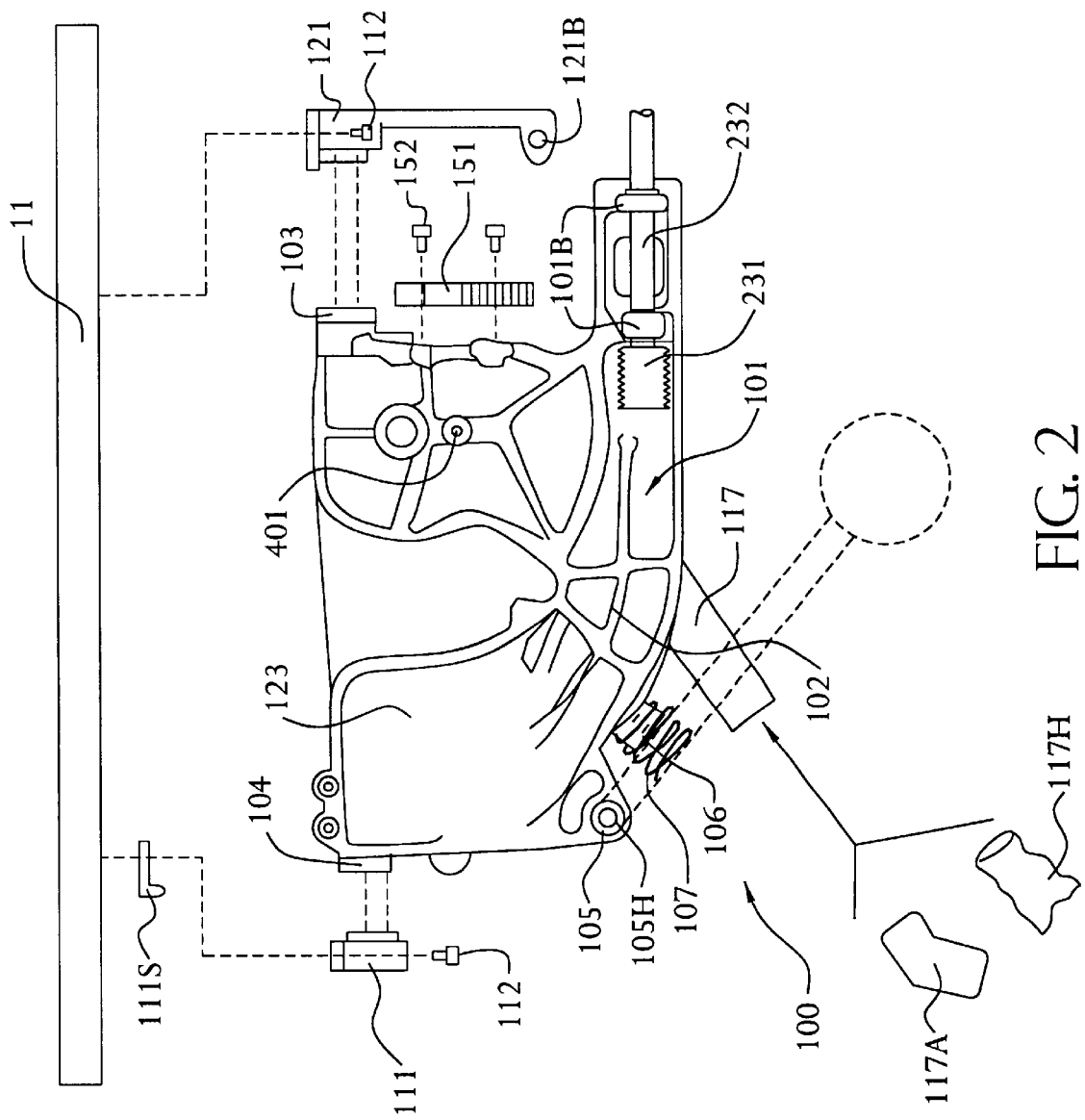
FIG. 2 is a side elevational view of the saw assembly.

Referring to FIG. 1, a switch 500 may be disposed on base assembly 2 to turn on and off motor 109. Preferably, switch 500 may be supported by leg 12 and/or front panel 13. Alternatively, switch 500 may be supported by table 11.

Figure 10:
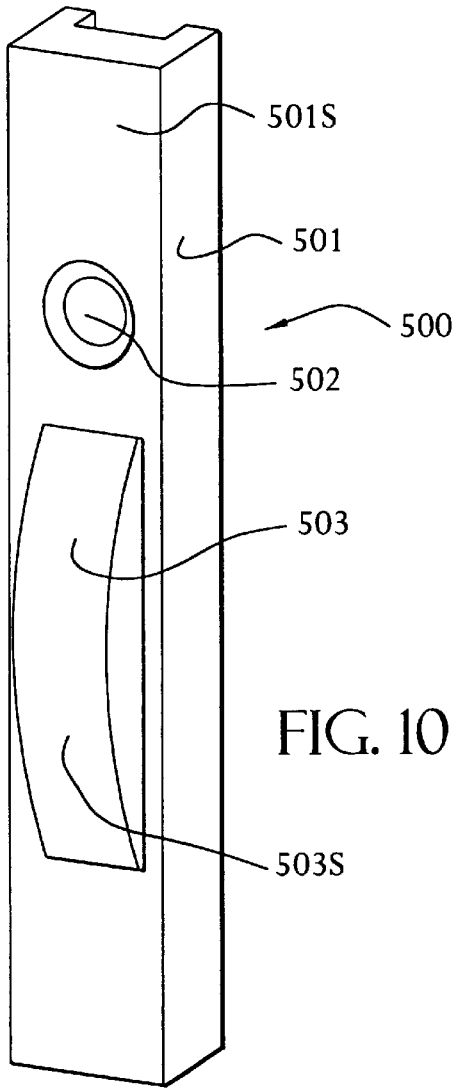
FIG. 10 is a perspective view of a first embodiment of an on-off switch.
Figure 11:
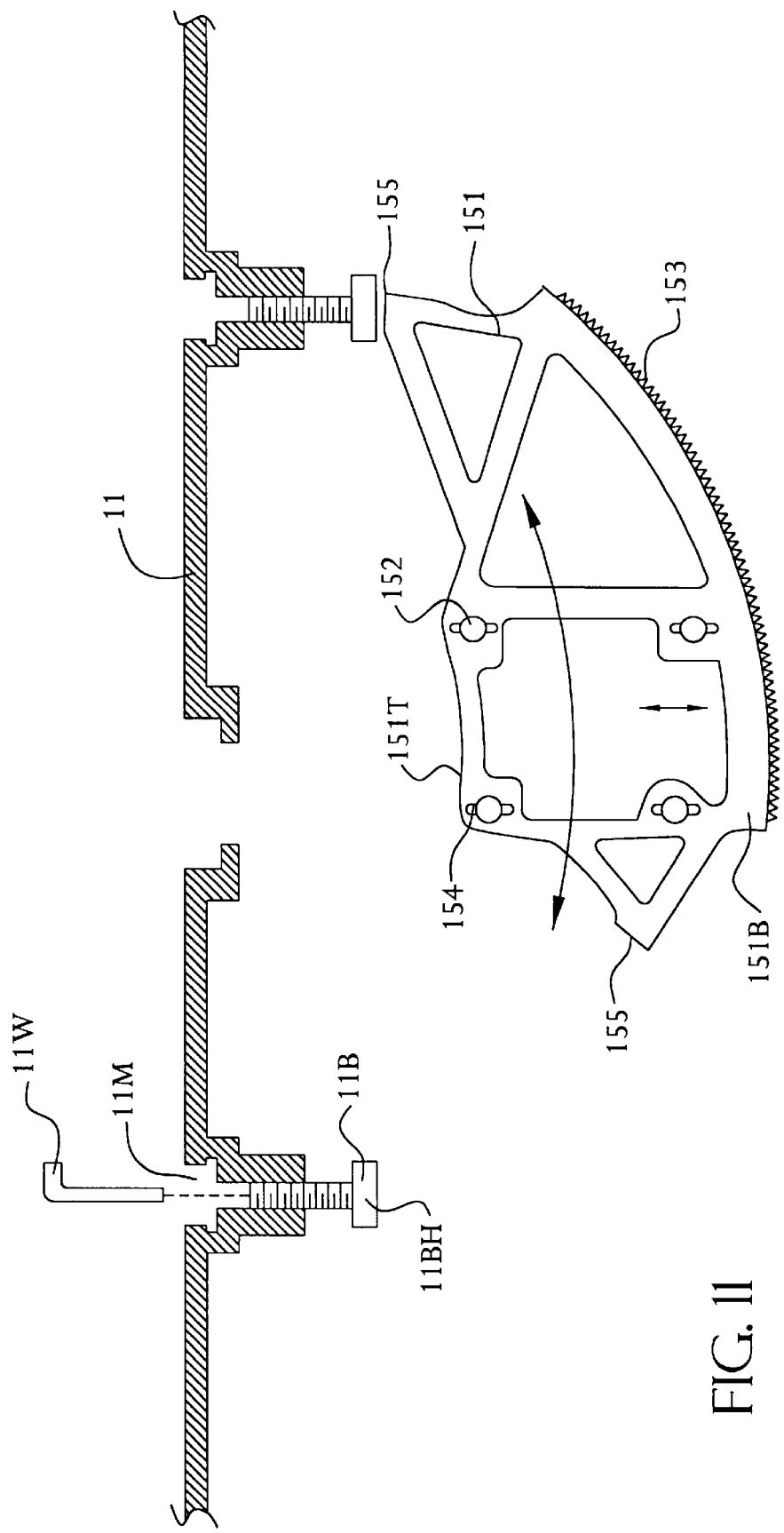
FIG. 11 is a partial cross-sectional view of the bevel stop mechanism.

FIG. 10 illustrates a first embodiment of switch 500, which preferably comprises a housing 501, an on switch 502 and an off switch 503. Preferably, on switch 502 is disposed below the surface 501S of housing 501. Off switch 503 may be disposed above the surface 501S. In this manner, it would be easier for the operator to turn off motor 109, rather than turn on motor 109.

It is also advantageous to make the on switch 502 smaller than the off switch 503. Preferably, on switch 502 is circular and has a diameter of about 1.1 inches and thus an area of about 0.95 square inches. In turn, the off switch 503 may be rectangular. The height and width of off switch 503 are preferably about 6.5 inches and 1.845 inches, respectively, providing an area of about 12 square inches. Persons skilled in the art will recognize that the area of off switch 503 can be increased by providing a curved contact surface 503S as shown in FIG. 10, rather than a flat contact surface.

Persons skilled in the art will recognize that it is preferable to provide an off switch having at least twice the area of the on switch. It is also preferable if the off switch has an area equal or larger to twelve times the area of the on switch.

Figure 15:
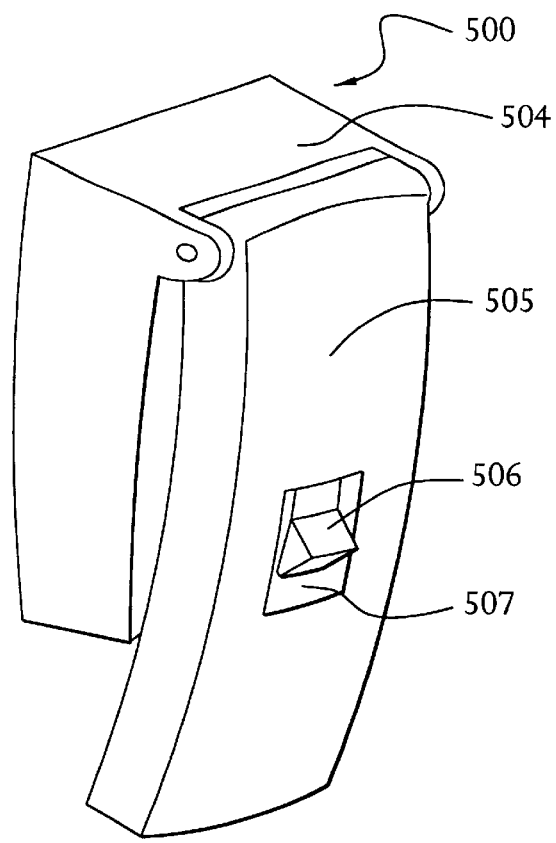
FIG. 15 is a perspective view of a second embodiment of an on-off switch.
Figure 16A:
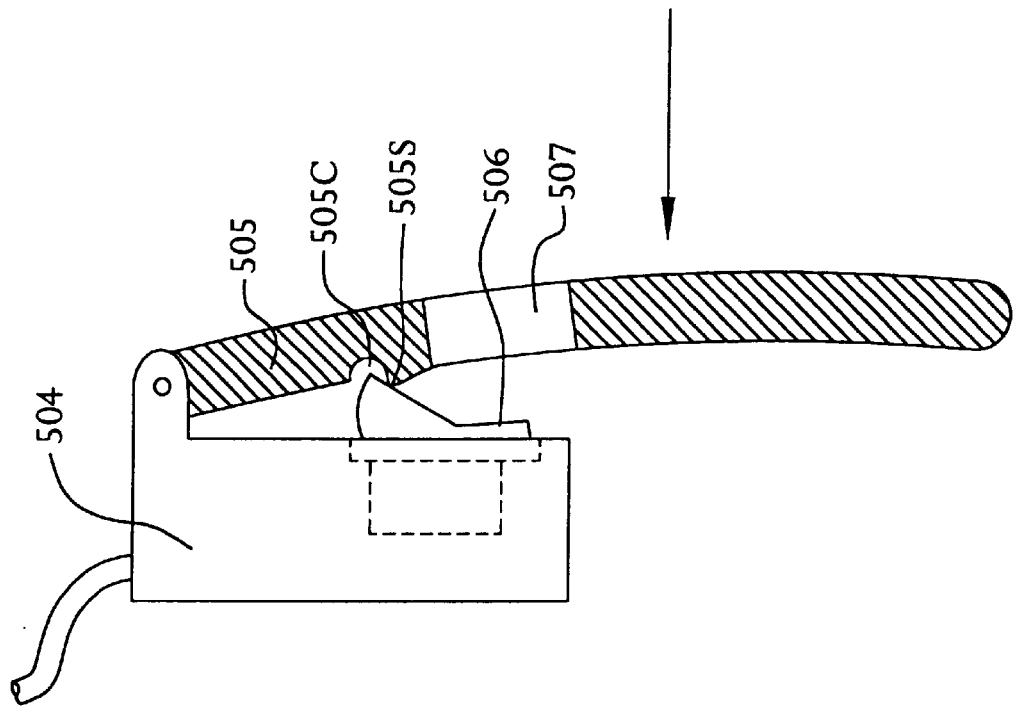
FIGS. 16A and 16B are partial cross-sectional views of the switch of FIG. 15 in different states of operation.
Figure 16B:
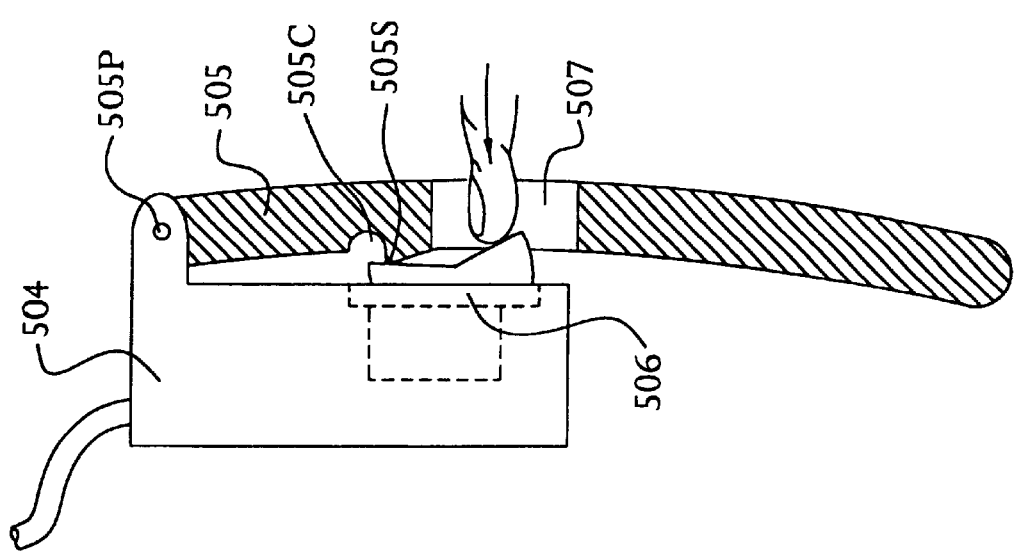

Another switch 500 is illustrated in FIGS. 15–16B. In this embodiment, switch 500 may comprise a housing 504, a contact plate 505 pivotally attached to the housing 504 via pin 505P, and a rocker switch 506 disposed within the housing 504. Plate 505 preferably has an opening 507. Plate 505 may also have a switch contact surface 505S which contacts switch 506.

With such arrangement, the operator can reach the switch 506 through opening 507 and push the switch 506 towards the on position, as shown in FIG. 16A. Plate 505 may be provided with a channel 505C to allow switch 506 to freely rotate towards the on position. The user can then turn off the table saw by pushing against plate 505, so that surface 505S pushes switch 506 towards the off position. Persons skilled in the art will recognize that the same result can be achieved by attaching the plate 505 to any other part of the table saw.

Figure 17B:
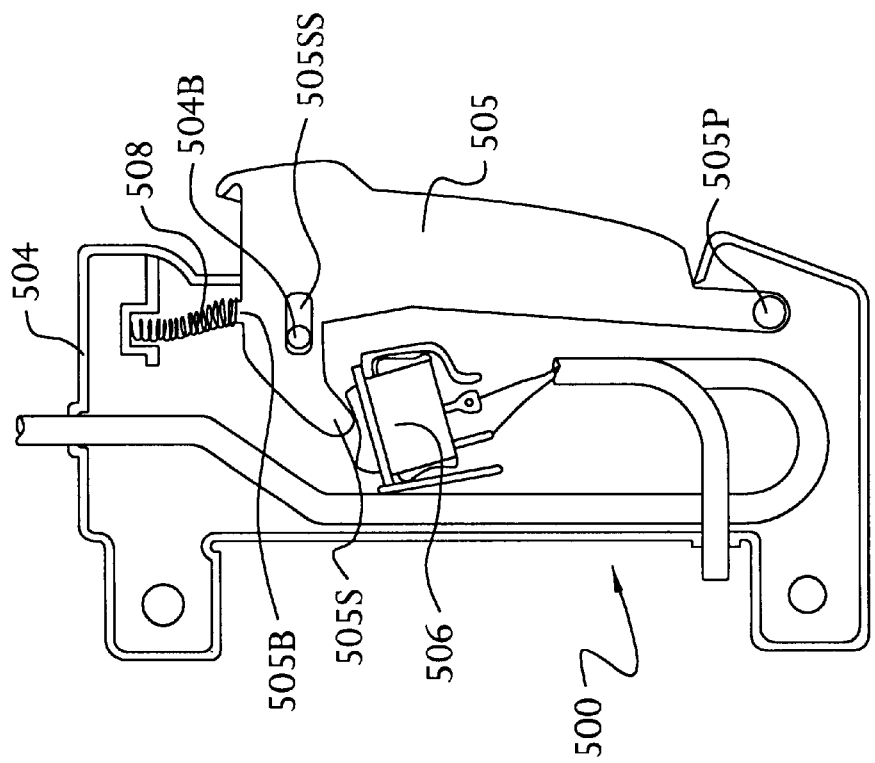
FIGS. 17A and 17B are partial cross-sectional views of a third embodiment of an on-off switch in different states of operation.
Figure 17A:
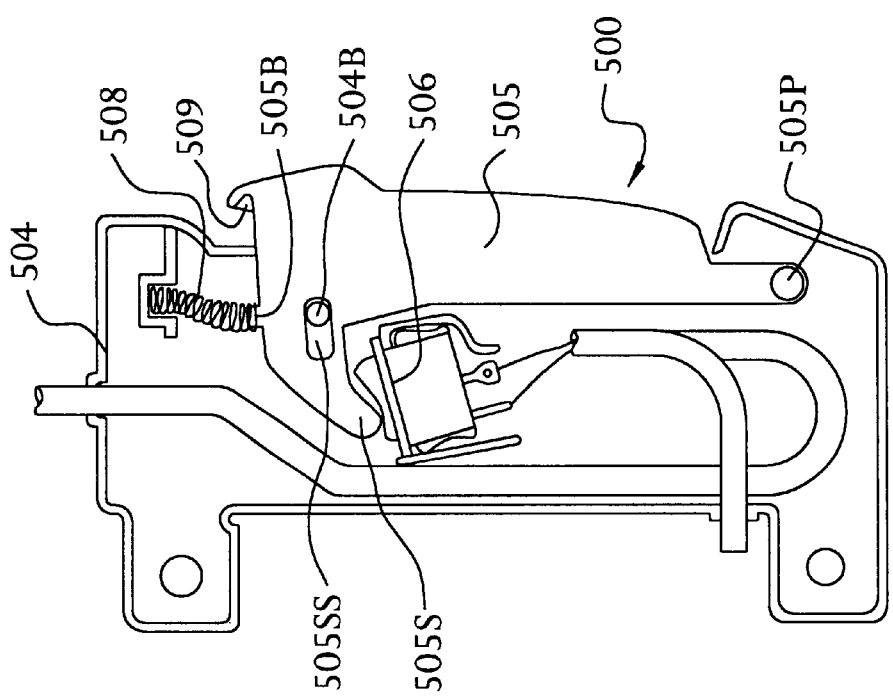

FIGS. 17A and 17B illustrates another switch 500, where like numerals refer to like parts. As above, switch 500 may comprise a housing 504, a contact plate 505 pivotally attached to the housing 504 via pin 505P, and a rocker switch 506 disposed within the housing 504. Unlike in the previous embodiment, switch contact surface 505S forces the switch 506 into both the on and off positions. Plate 505 may also have a pulling portion 509.

With such arrangement, a user can turn on the table saw by pulling plate 505 via pulling portion 509. Plate 505 pivots about pin 505P and surface 505S moves the switch 506 towards the on position, as shown in FIG. 17B. To turn the table saw off, the user pushes on plate 505, forcing surface 505S to move the switch 506 towards the off position, as shown in FIG. 17A.

A spring 508 is preferably disposed between housing 504 and plate 505 to bias the plate 505 towards the on and/or off positions. In the present embodiment, spring 508 biases plate 505 towards both the on and off positions. The spring 508 preferable engages a boss 505B on plate 505. The position of boss 505B may be chosen so that, when the boss 505B is in the on and/or off positions, it is offset from the position of maximum spring force.

Plate 505 may have a slot 505SS sliding along boss 504B of housing 504 to limit the range of movement of plate 505.

In other words, boss 504B will limit how far plate 505 can move in a direction. Accordingly, if a user hits plate 505 with extreme force, boss 504B will stop plate 505 and prevent the transfer of all that force to switch 506.

Slot Seal Mechanisms

FIGS. 20–33 disclose different embodiments of a slot seal mechanism for sealing the slot 17 so that an operator cannot access the saw assembly 100 through front panel 13 and/or to prevent dust from escaping through slot 17. These slot seal mechanisms preferably do not interfere with the movement of height crank 15 and its corresponding shaft along slot 17.

Figure 20:
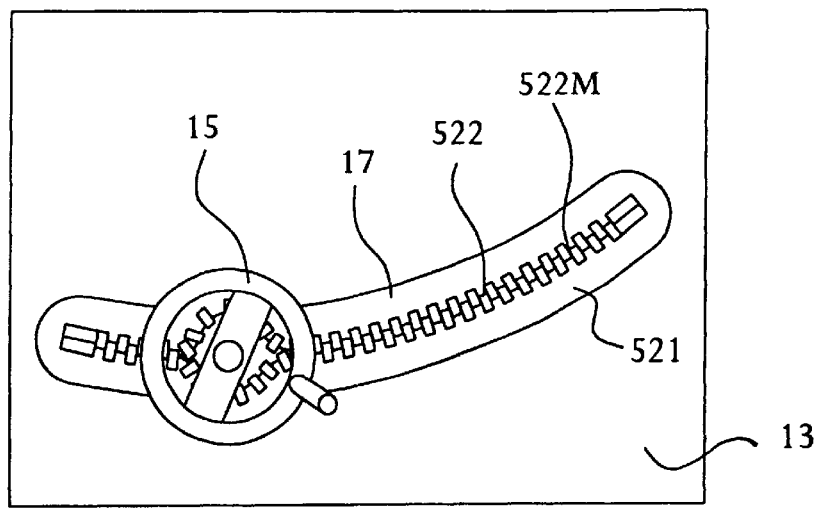
FIG. 20 is a front elevational view of a first embodiment of a slot seal mechanism.
Figure 21:
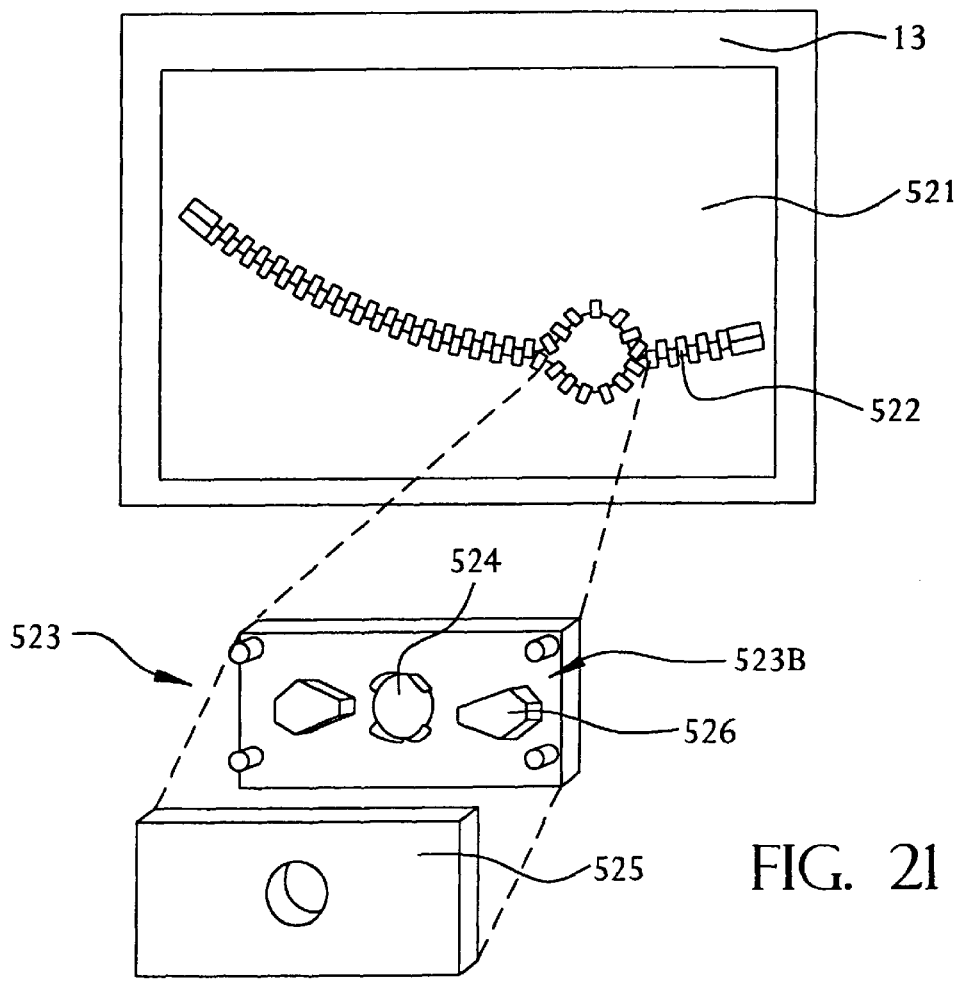
FIG. 21 is a rear elevational view of the slot seal of FIG. 20.
Figure 28:
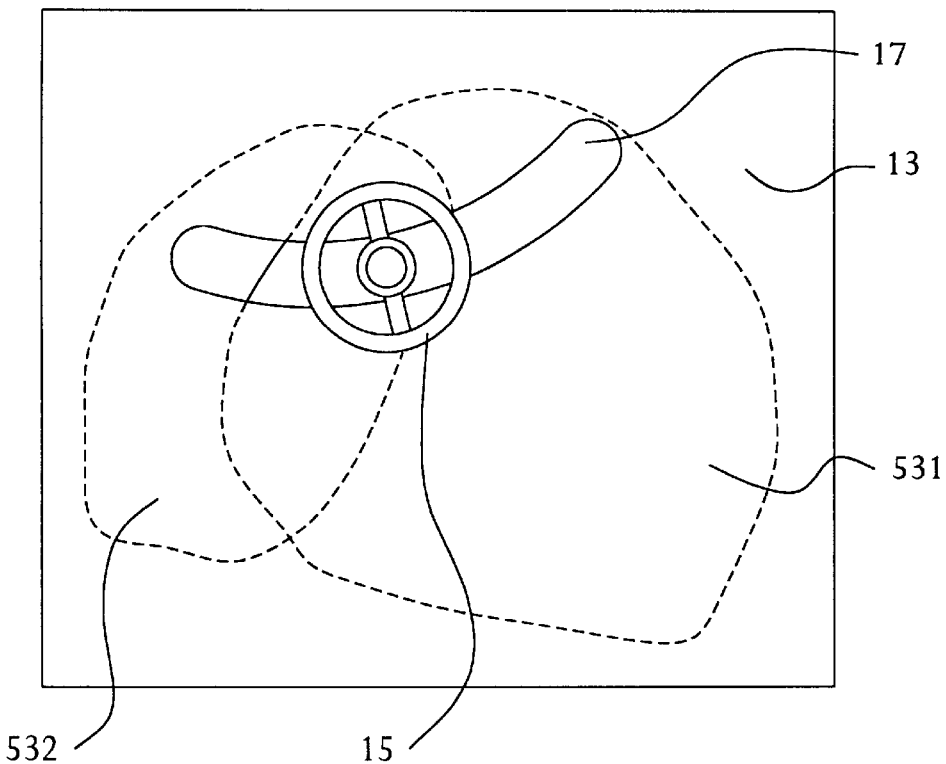
FIG. 28 is a front elevational view of a fourth embodiment of a slot seal mechanism.
Figure 29A:
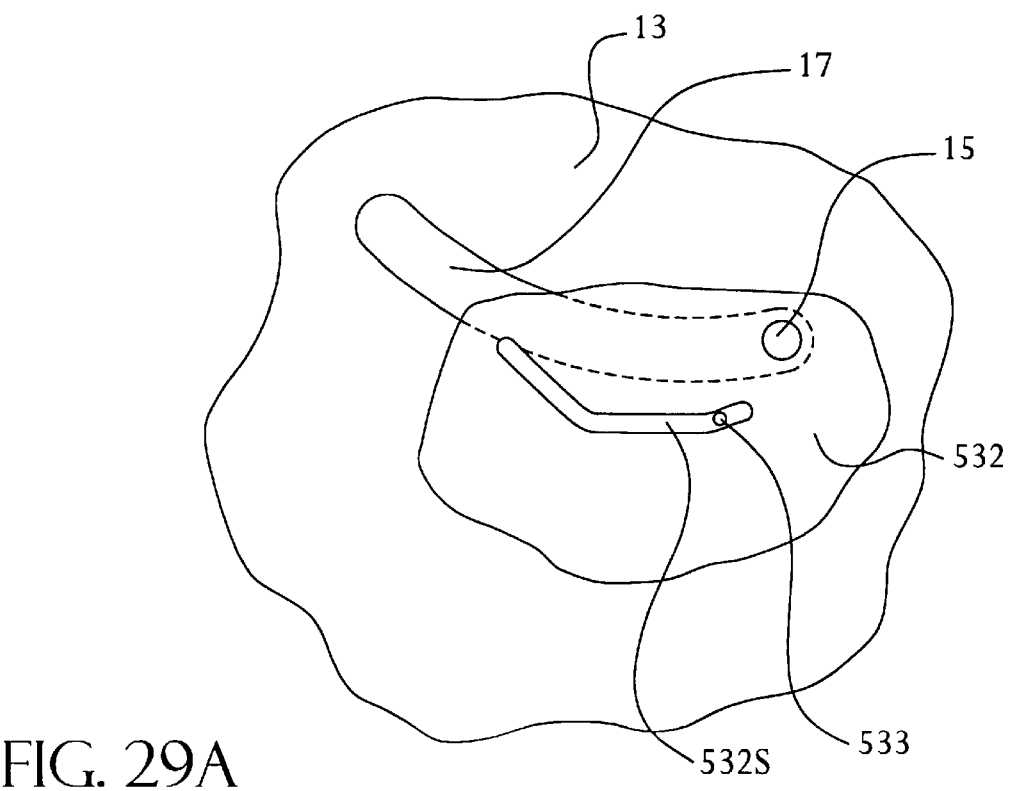
Figure 30A:
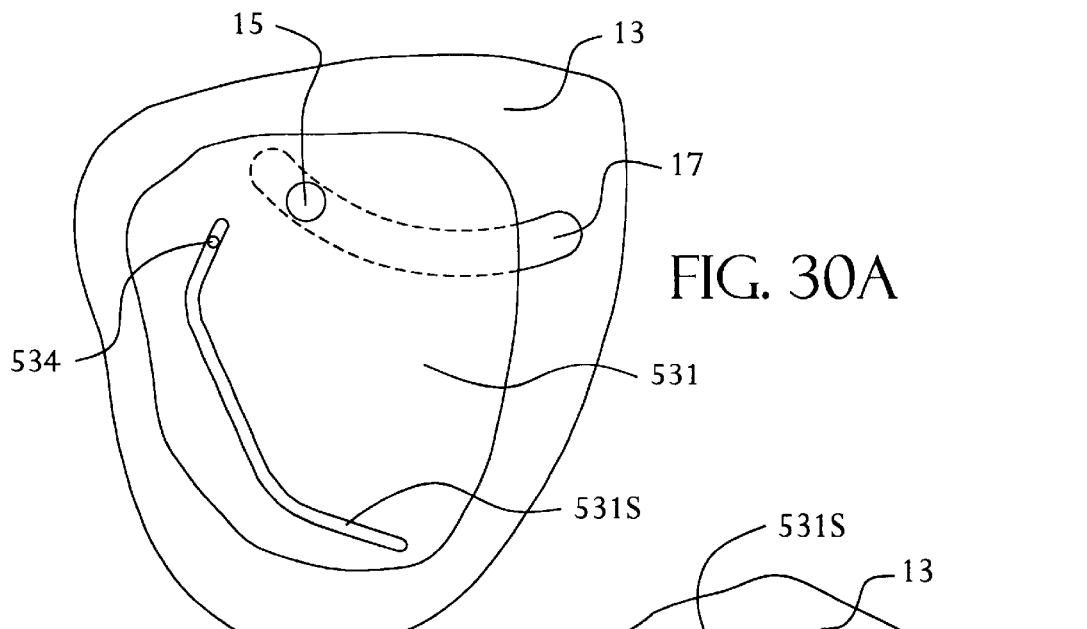
FIGS. 30A–D are rear elevational views of the slot seal mechanism of FIG. 28, illustrating the movement of the second plate as the shaft moves from one end of the bevel slot to the other end.
Figure 30B:
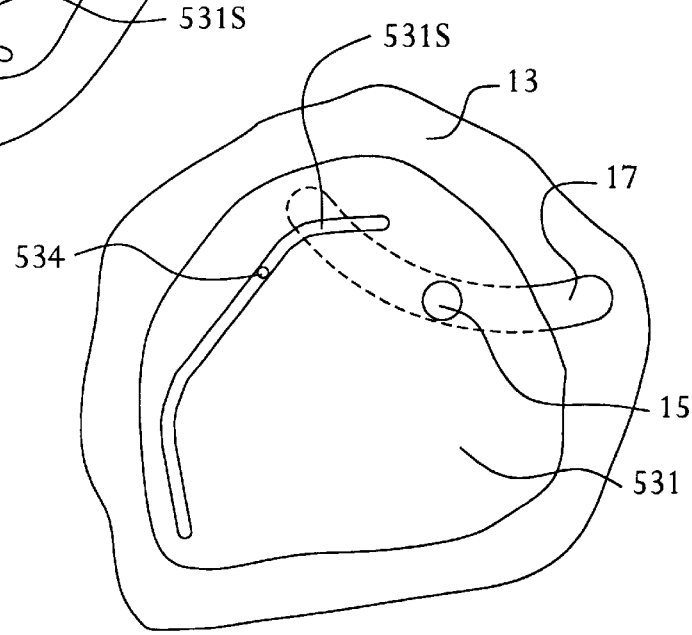
Figure 30C:
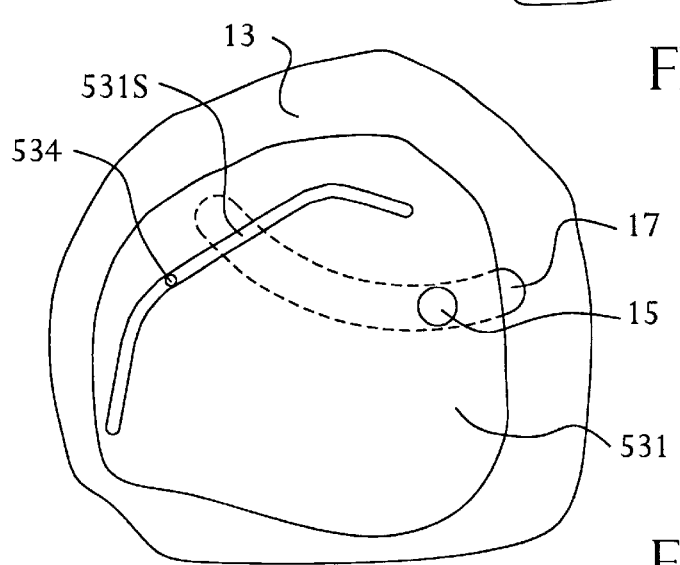
Figure 30D:
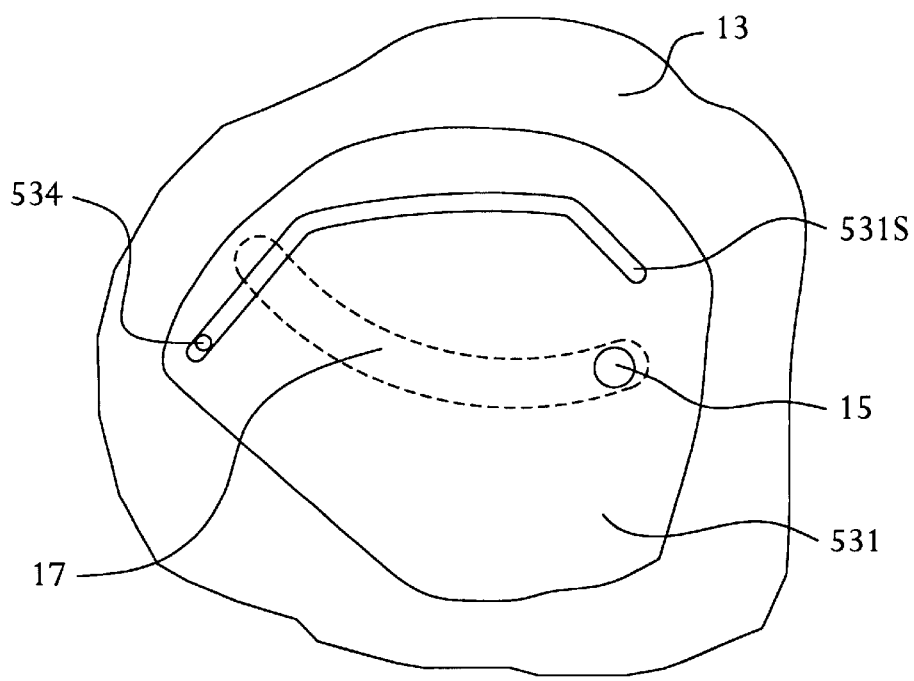

FIGS. 20–21 illustrate a first embodiment of a slot seal mechanism. In order to seal slot 17, a panel 521 of flexible material, such as cloth or plastic, is attached to panel 13. A slot 522 is disposed on panel 521 to allow crank 15 (or its corresponding shaft) to move therealong. Zipper strips 522M are disposed along slot 522.

A zipper closing assembly 523 is disposed on panel 521 for opening and/or closing zipper strips 522M. Preferably the closing assembly 523 has a hole 534 for allowing crank 15 or the height shaft to extend therethrough. Closing assembly 523 may have a base 523B and a front panel 525 supported by base 523B. Zipper strips 522M may be disposed between base 523B and front panel 525. Base 523B may carry wedges 526 for separating the zipper strips 522M and/or for joining the zipper strips 522M, thus opening and closing the zipper.

Accordingly, as crank 15 or the height shaft is moved along slot 17, the assembly 523 moves therewith in the same direction. The first wedge 526 to encounter the zipper strips 522M will separate them as the assembly 523 moves, while the second wedge 526 will bring the zipper strips 522M together, as is well known in the zipper art.

Persons skilled in the art will recognize that the zipper strips 522M shown are the traditional multi-teethed zipper strips. However, persons skilled in the art will recognize that other closing means, such as the interlocking groove zipper usually found in common plastic bags, or hook-and-loop fasteners, etc., may be used instead.

FIGS. 22–24 illustrate another embodiment of the slot seal mechanism, where like numerals refer to like parts. In this embodiment, top flap 528 and bottom flap 527 are attached to front panel 13 along slot 17. Preferably top and bottom flaps 528, 527 overlap to seal slot 17. Top and bottom flaps 528, 527 may be made of a resilient material, such as plastic or rubber. Because of this resiliency, the crank 15 or the corresponding height shaft may move through the top and bottom panels, as shown in FIG. 24.

Accordingly, as crank 15 moves, it will push the top and bottom flaps 528, 527, which bend to accommodate crank 15. After crank 15 has passed, the top and bottom flaps 528, 527 will return to the sealing position shown in FIG. 23.

Persons skilled in the art should recognize that the flaps may have profiles other than the flat profiles shown in the figures, in order to increase their resiliency or to improve the seal.

FIGS. 22–24 illustrate another embodiment of the slot seal mechanism, where like numerals refer to like parts. In this embodiment, a track 530 is disposed on panel 13. Preferably track 530 is comprised of upper track 530A and lower track 530B, defining a channel 529C. Upper and lower tracks 530A, 530B are preferably made of sheet metal.

A sliding plate 529 is preferably disposed in channel 529C and is preferably made of resilient plastic or rubber. A hole 529H may be provided in the middle of plate 529 for accepting crank 15, or the corresponding height shaft, therethrough. Preferably, plate 529 is long enough so that it covers the entire slot 17 at any position therealong. If, because of the length of plate 529, it extends beyond panel 13 at any position, track 350 may be angled or curved to force plate 529 to bend in order to avoid extension beyond panel 13. Persons skilled in the art will also recognize that track 530 may be designed to bend plate 529 in order to maintain plate 529 within base assembly 2 and/or the envelope of the table 11.

FIGS. 28–30D illustrate another embodiment of the slot seal mechanism, where like numerals refer to like parts. In this embodiment, first and second plates 532, 531, respectively, are pivotally attached to crank 15, or the corresponding height shaft, and movably connected to front panel 13..

As shown in FIGS. 29A–29D, front panel 13 may have a roller or boss 533. First plate 532 may have a track or slot 532S which slidingly receives the boss 533. Accordingly, as crank 15 moves along slot 17, plate 532 moves therewith. Plate 532 also rotates and/or moves according to the shape of slot 532S.

Similarly, referring now to FIGS. 30A–30D, front panel 13 may have a roller or boss 534. Second plate 531 may have a track or slot 531S which slidingly receives the boss 534. As before, plate 531 rotates and/or moves according to the shape of slot 531S, as it is pulled by crank 15.

Persons skilled in the art will recognize that it is preferable to "program", or shape, the slots 531S, 532S so that both plates 531, 532 will cover slot 17.

Figure 31A:
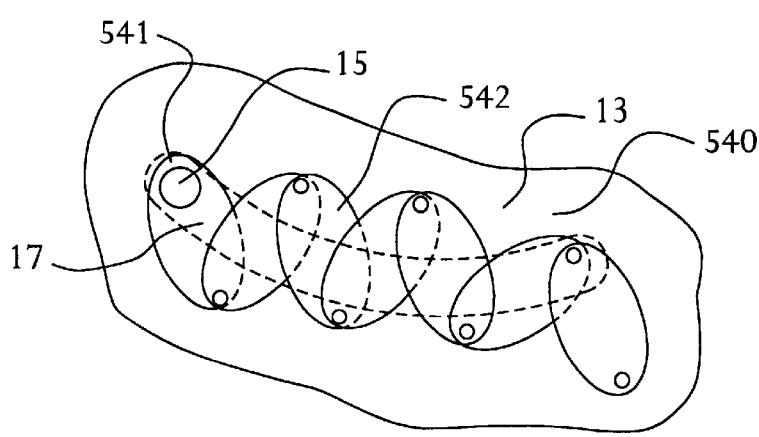
FIGS. 31A–B are rear elevational views of a fifth embodiment of a slot seal mechanism, illustrating the movement of the sealing plates as the shaft moves from one end of the bevel slot to the other end.
Figure 31B:
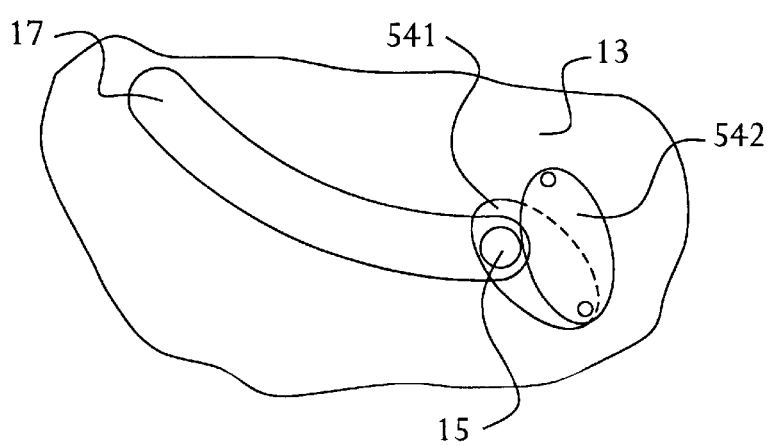

FIGS. 31A–31B illustrate another embodiment of the slot seal mechanism, where like numerals refer to like parts. In this embodiment, slot seal mechanism 540 comprises a crank plate 541, which has a hole (not shown) to allow crank 15, or the corresponding height shaft, therethrough. Crank plate 541 is operatively connected to at least one cover plate 542. In this embodiment, crank plate 541 is pivotally attached to cover plate 542, which in turn is pivotally attached to another cover plate 542, etc. These cover plates 542 are ultimately attached to a cover plate 542 which is pivotally attached to panel 13.

As shown in FIG. 31A, as crank 15 is moves to the farthest end, plates 542 pivot and extend, to cover slot 17. However, as crank 15 moves to the nearest end, plates 542 pivot and fold underneath each other, as shown in FIG. 31B. Persons skilled in the art will recognize that only one set of plates 542 has been shown for the sake of clarity, but that two sets of plates 542 may be disposed on each side of crank 15 in order to seal the entire slot 17 at any position of crank 15.

Figure 32:
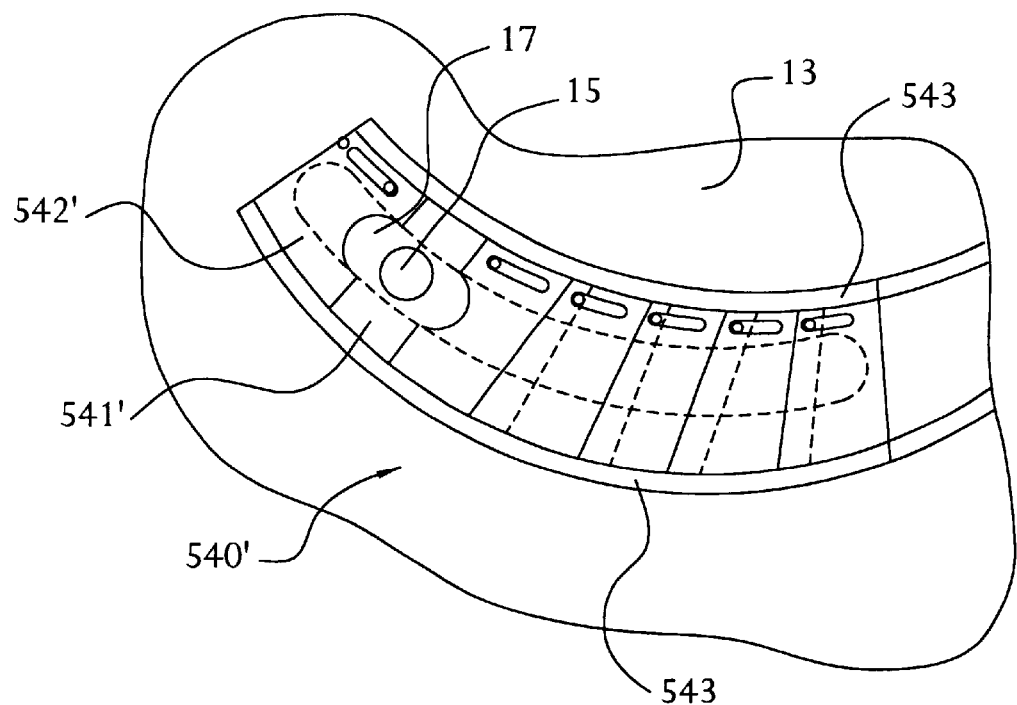
FIG. 32 is a rear elevational view of a sixth embodiment of a slot seal mechanism.
Figure 33:
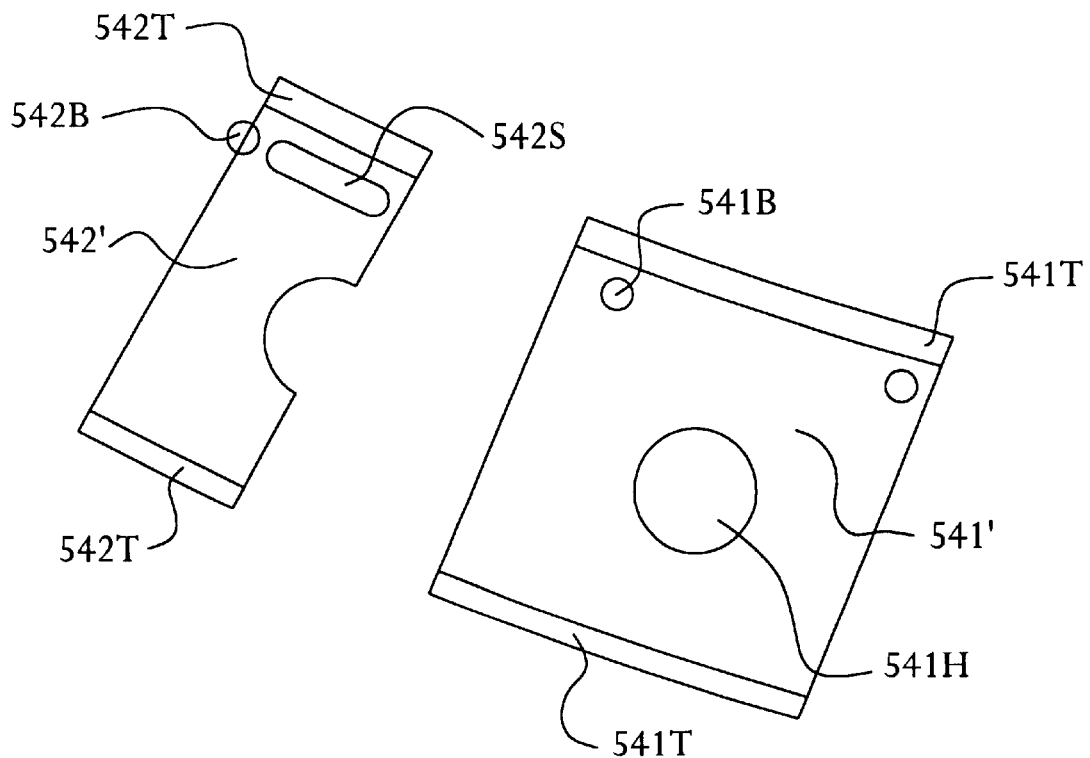
FIG. 33 is a detail view of the sealing plates used in the slot seal mechanism of FIG. 32.

FIGS. 32–33 illustrate another embodiment of the slot seal mechanism, where like numerals refer to like parts. This embodiment is similar to the embodiment shown in FIGS. 31A–31B.

In this embodiment, slot seal mechanism 540' comprises a crank plate 541', which has a hole 541H to allow crank 15, or the corresponding height shaft, therethrough. Crank plate 541' is operatively connected to at least one cover plate 542'. In this embodiment, crank plate 541' has a boss 541B, which slidingly engages cover plate 542' via slot 542S. Plate 542' may also have a boss 542B which can slidingly engage the slot 542S of another cover plate 542'. Accordingly, a plurality of cover plates 542' may be connected to each other in this manner, and may be ultimately attached to a cover plate 542' which is attached to panel 13.

Plates 541', 542' may have at least one track edge 541T, 542T, respectively, which slidingly engages at least one track 543 disposed on panel 13. Accordingly, as crank 15 moves along slot 17, plate 541' moves along tracks 543. Boss 541B moves along slot 542S until it reaches the end of slot 542S. Boss 541B then forces plate 542' to move along slot 17 and/or its boss 542B to move along slot 542S. Also, as plate 541' pushes plate 542', a second boss 541B may pull on another plate 542', which ultimately pulls on another, etc. With such interleaving construction, slot 17 can be sealed.

Figure 46:
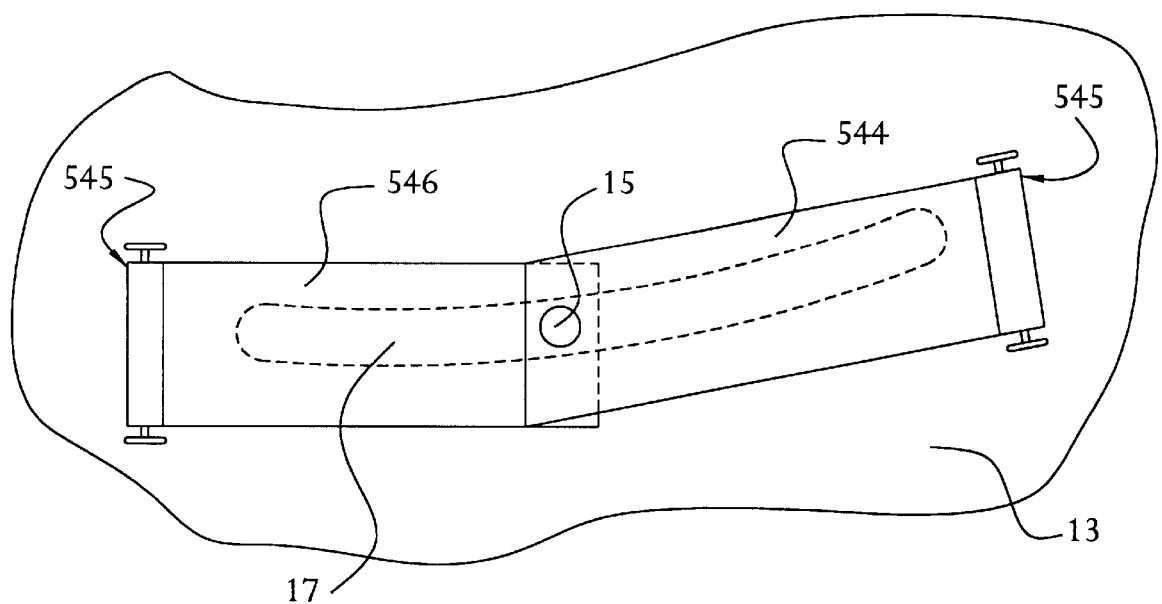
FIG. 46 is a rear elevational view of a seventh embodiment of a slot seal mechanism.

FIG. 46 illustrate another embodiment of the slot seal mechanism, where like numerals refer to like parts. In this embodiment, roller assemblies 545 may be disposed on panel 13 near the ends of slot 17. Panels 544, 546 may be retractably attached roller assemblies 545. Persons skilled in the art are referred to the roller assemblies found in window shades and/or tape measurers, where the shade or tape are retractably attached to the corresponding roller assemblies, allowing the shade or tape to be pulled away from the roller assembly and/or to be automatically retracted via the roller assembly.

Crank 15, or the corresponding shaft, preferably extends through both panels 544, 546. With the above construction, as crank 15 is moved along slot 17, it will move closer to one roller assembly 545, which in turn retracts one panel. At the same time, crank 15 will move farther from the other roller assembly 545, which in turn allows crank 15 to pull the other panel. By having both panels 544, 546 acting in conjunction, the slot 17 may be sealed.

Figure 47:
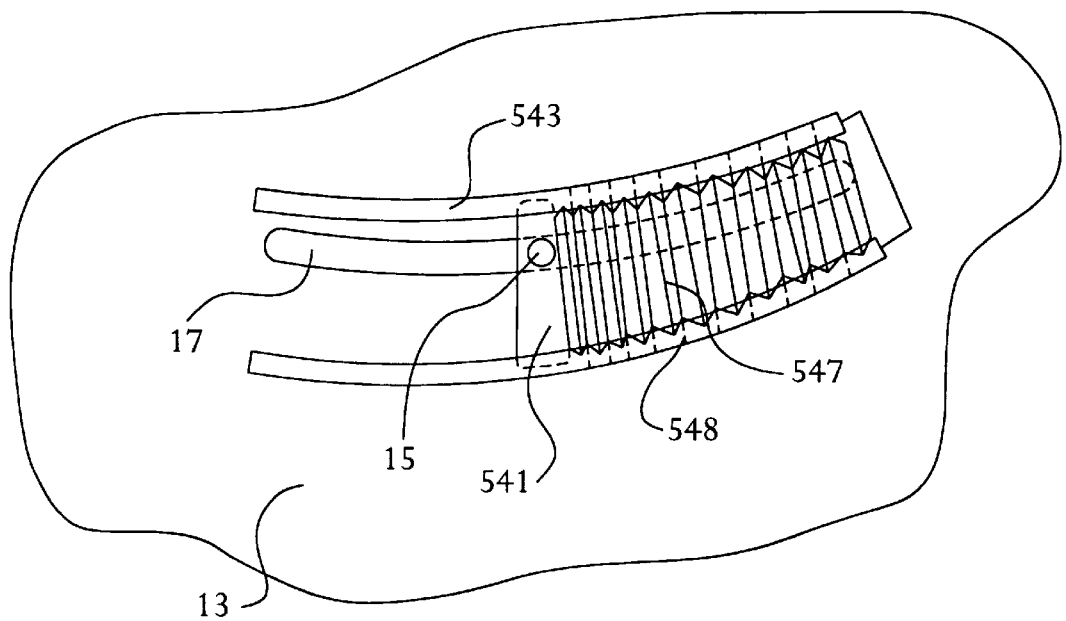
FIG. 47 is a rear elevational view of an eighth embodiment of a slot seal mechanism.

FIG. 47 illustrate another embodiment of the slot seal mechanism, where like numerals refer to like parts. Like before, a crank plate 541 which engages crank 15, or the height shaft, may be slidingly disposed on tracks 543. A panel 547 may be connected at one end to plate 541 and at the other to panel 13. Preferably panel 547 is made of a bendable material, such as cloth, plastic, rubber, metal, etc. Panel 547 may have rods 548 inserted therein, which may be in turn slidingly disposed on tracks 543.

Accordingly, as crank 15 is moved along slot 17, it will force rods 548 to slide along tracks 543 and/or force panel 547 to fold into pleats or unfold. Persons skilled in the art will recognize that only one panel 547 has been shown in FIG. 47 for the sake of clarity, but that two panels 547 may be provided in order to completely cover slot 17.

Persons skilled in the art will recognize that all these slot sealing mechanism are preferably disposed on the back of panel 13, so as to prevent the user from incorrectly manipulating the mechanisms.

Scoring Mechanism 350

Referring to FIGS. 12–13, the table saw may be provided with a scoring mechanism 350. Preferably scoring mechanism 350 is placed in front of blade 14, so that, when users push a workpiece towards blade 14, bit 351 will score the underside of the workpiece, thus decreasing workpiece splintering.

Unlike prior art scoring mechanisms which use a blade rotating about an axis substantially parallel to the rotational axis of blade 14 and/or the table plane, the present scoring mechanism has a rotatable bit 351 which rotates about an axis which is substantially perpendicular to the rotational axis of blade 14 and/or the table plane. Bit 351 may be rotated by a motor (not shown) disposed in a housing 352.

Both housing 352 and bit 351 are preferably movable in a direction substantially perpendicular to the table plane. A possible means for achieving such purpose may include vertical supports 353 connected to the underside of table 11, which slidably receive stays 355. A bolt 354 may threadingly engage a stay 355 to fix the position of housing 352. Persons skilled in the art will recognize other means to change the vertical position of bit 351 and/or housing 352. For example, a rack and pinion system can be used to effect movement of housing 352 and/or bit 351.

Persons skilled in the art may also recognize other alternatives to the means disclosed herein. However, all these additions and/or alterations are considered to be equivalents of the present invention.

We claim:

1. A saw comprising:
   a table;
   a base supporting the table;
   a saw assembly pivotably connected to at least one of the table and the base for carrying a rotatable cutting tool so that the tool protrudes through and above the table, at least part of the saw assembly being underneath the table, the saw assembly comprising a cradle, an arbor bracket pivotally connected to the cradle, an arbor rotatably supported by the arbor bracket, and a sector gear connected to the cradle;
   a motor bracket connected to the cradle for supporting a motor, the motor bracket being pivotally connected to the cradle;
   a spring disposed between the cradle and the motor bracket for biasing the motor bracket away from the cradle;
   a height adjustment shaft supported by the cradle and contacting the arbor bracket; and
   a bevel adjustment shaft supported by the cradle and contacting the sector gear,
   wherein distance between the height adjustment shaft and the table is larger than distance between the bevel adjustment shaft and the table.

2. The saw of claim 1, further comprising a cover attached to the cradle.

3. The saw of claim 1, wherein the height adjustment shaft has a gear meshing with the arbor bracket.

4. The saw of claim 1, wherein the height adjustment shaft has a worm drive, and the arbor bracket has a rack meshing with the worm drive.

5. The saw of claim 1, wherein the bevel adjustment shaft has a gear meshing with the sector gear.

6. The saw of claim 1, wherein the bevel adjustment shaft has a worm drive, and the sector gear has a rack meshing with the worm drive.

7. The saw of claim 1, wherein the saw assembly further comprises a motor supported by the cradle.

8. The saw of claim 7, wherein the motor is operatively connected to the arbor.

9. The saw of claim 7, wherein the motor has a drive shaft connected to the arbor via a belt.

10. The saw of claim 1, further comprising a pulley connected to the arbor.

11. The saw of claim 10, wherein the pulley is constructed of two halves.

12. The saw of claim 10, wherein the pulley is made of powdered metal.

13. The saw of claim 1, further comprising a first bevel stop disposed underneath the table, wherein the first bevel stop can contact the sector gear when the saw assembly is pivoted in one direction.

14. The saw of claim 13, wherein the first bevel stop is adjustable.

15. The saw of claim 13, wherein the first bevel stop is adjustable from above the table.

16. The saw of claim 13, wherein the first bevel stop is movable between first and second positions, where, in the first position, the first bevel stop contacts the sector gear and, in the second position, the first bevel stop bypasses the sector gear.

17. A saw comprising:

a table;

a base supporting the table;

a saw assembly pivotably connected to at least one of the table and the base for carrying a rotatable cutting tool so that the tool protrudes through and above the table, at least part of the saw assembly being underneath the table, the saw assembly comprising a cradle, an arbor bracket pivotally connected to the cradle, an arbor rotatably supported by the arbor bracket, and a sector gear connected to the cradle;

a motor bracket connected to the cradle for supporting a motor, the motor bracket being pivotally connected to the cradle;

a spring connected to the motor bracket for biasing the motor bracket away from the cradle;

a height adjustment shaft supported by the cradle and contacting the arbor bracket; and a bevel adjustment shaft supported by the cradle and contacting the sector gear, wherein distance between the height adjustment shaft and the table is larger than distance between the bevel adjustment shaft and the table.

18. The saw of claim 17, further comprising a cover attached to the cradle.

19. The saw of claim 17, wherein the height adjustment shaft has a gear meshing with the arbor bracket.

20. The saw of claim 17, wherein the height adjustment shaft has a worm drive, and the arbor bracket has a rack meshing with the worm drive.

21. The saw of claim 17, wherein the bevel adjustment shaft has a gear meshing with the sector gear.

22. The saw of claim 17, wherein the bevel adjustment shaft has a worm drive, and the sector gear has a rack meshing with the worm drive.

23. The saw of claim 17, wherein the saw assembly further comprises a motor supported by the cradle.

24. The saw of claim 23, wherein the motor is operatively connected to the arbor.

25. The saw of claim 23, wherein the motor has a drive shaft connected to the arbor via a belt.

* * * * *